(12) United States Patent
Scott et al.

(10) Patent No.: US 9,734,473 B2
(45) Date of Patent: Aug. 15, 2017

(54) COMPUTER-IMPLEMENTED SYSTEM FOR HIERARCHICAL UNCONSTRAINING IN DATA PROCESSES

(71) Applicant: SAS Institute Inc., Cary, NC (US)

(72) Inventors: Kevin L. Scott, Raleigh, NC (US); Metin Balikcioglu, Cary, NC (US); Bingfeng Ding, Cary, NC (US); Shengkuei Lin, Cary, NC (US); Tugrul Sanli, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 15/257,545

(22) Filed: Sep. 6, 2016

(65) Prior Publication Data

US 2017/0068484 A1 Mar. 9, 2017

Related U.S. Application Data

(60) Provisional application No. 62/213,982, filed on Sep. 3, 2015, provisional application No. 62/238,278, filed on Oct. 7, 2015.

(51) Int. Cl.
*G06Q 10/06* (2012.01)
*H04L 12/911* (2013.01)
(Continued)

(52) U.S. Cl.
CPC ......... *G06Q 10/0631* (2013.01); *G06Q 10/02* (2013.01); *G06Q 10/06* (2013.01);
(Continued)

(58) Field of Classification Search
CPC ............... G06Q 30/02; G06Q 30/0283; G06Q 30/0202; G06Q 10/02; G06Q 10/06;
(Continued)

(56) References Cited

U.S. PATENT DOCUMENTS 7,110,960 B2* 9/2006 Phillips ................. G06Q 10/06
705/400
7,720,551 B2* 5/2010 Tantawi ................. G06F 9/505
700/1

(Continued)

OTHER PUBLICATIONS

"SAS Revenue management and Price optimization Analytics 1.5—Consultants Guide", Chapter 9, SAS Institute, Inc., Apr. 2015, 15 pages (author unknown).

(Continued)

*Primary Examiner* — Ramy M Osman

(57) ABSTRACT

Exemplary embodiments are generally directed to methods, mediums, and systems for correcting censored or constrained historical data with various possible types of computing devices, including cloud-based devices, personal computing devices, and edge-based devices. The corrected data may be used in forecasting, for example to forecast demand for a limited resource. In some embodiments, the data is modeled at a higher level of granularity than an individual record. The aggregated demand may then be pro-rated over a group of categories or users where a given category of users that might be small or nonexistent over a certain time frame may be better accommodated. Moreover, it may be easier or more efficient to make assumptions and employ computing resources at the aggregate level.

30 Claims, 18 Drawing Sheets

(51) Int. Cl.
*G06Q 50/12* (2012.01)
*G06Q 10/02* (2012.01)
*G06Q 30/02* (2012.01)

(52) U.S. Cl.
CPC ... *G06Q 10/06312* (2013.01); *G06Q 30/0202* (2013.01); *G06Q 50/12* (2013.01); *H04L 47/782* (2013.01); *H04L 47/823* (2013.01)

(58) Field of Classification Search
CPC .......... G06Q 10/0631; G06Q 10/0206; G06Q 10/04; G06Q 10/06312; G06Q 50/12; H04L 47/823; H04L 47/782
See application file for complete search history.

(56) References Cited

U.S. PATENT DOCUMENTS

| | | | | |
|---|---|---|---|---|
| 9,165,471 | B1 * | 10/2015 | Chen | G06Q 10/0631 |
| 2002/0120492 | A1 * | 8/2002 | Phillips | G06Q 10/06 705/7.35 |
| 2003/0018546 | A1 * | 1/2003 | Ayala | G06Q 10/06 705/28 |
| 2003/0036946 | A1 * | 2/2003 | Lin | G06Q 10/06 705/7.31 |
| 2003/0065542 | A1 * | 4/2003 | Gliozzi | G06Q 10/02 705/5 |
| 2003/0115093 | A1 * | 6/2003 | Lim | G06Q 30/0202 705/7.31 |
| 2003/0177103 | A1 * | 9/2003 | Ivanov | G06Q 30/02 705/400 |
| 2006/0070060 | A1 * | 3/2006 | Tantawi | G06F 9/505 717/174 |
| 2008/0086731 | A1 * | 4/2008 | Trossman | G06F 9/50 718/100 |
| 2008/0215414 | A1 * | 9/2008 | Fehnel | G06Q 10/0631 705/7.16 |
| 2009/0235268 | A1 * | 9/2009 | Seidman | G06F 11/3442 718/104 |
| 2012/0116844 | A1 * | 5/2012 | Menich | G06Q 30/02 705/7.31 |
| 2012/0310706 | A1 * | 12/2012 | Nguyen | G06Q 10/02 705/7.31 |
| 2014/0257925 | A1 * | 9/2014 | Tracy | G06Q 30/0202 705/7.31 |
| 2015/0288571 | A1 * | 10/2015 | Baughman | H04L 41/145 703/21 |
| 2017/0068484 | A1 * | 3/2017 | Scott | G06F 3/0647 |
| 2017/0078221 | A1 * | 3/2017 | Ding | H04L 47/823 |

OTHER PUBLICATIONS

"Example 69.2 Computing Predicted Values for a Tobit Model", retrieved at <http://support.sas.com/documentation/cdl/en/statug/68162/HTML/default/viewer.htm>, 4 pages, (author unknown).

Scott, Kevin, "Hierarchical Unconstraining", SAS Institute, Inc., 2012, 31 pages.

* cited by examiner

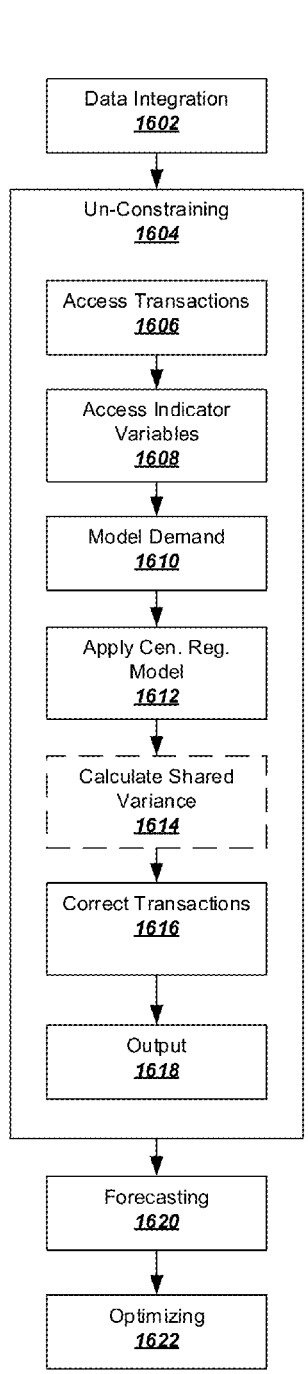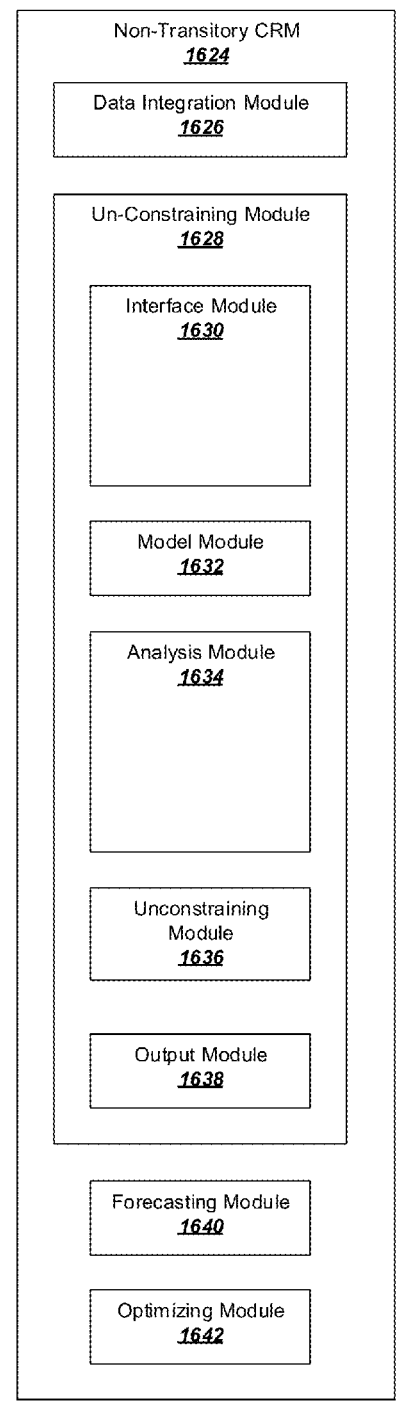
FIG. 16A
FIG. 16B

COMPUTER-IMPLEMENTED SYSTEM FOR HIERARCHICAL UNCONSTRAINING IN DATA PROCESSES

CROSS-REFERENCE TO RELATED APPLICATIONS

This application claims the benefit of priority under 35 U.S.C. §119(e) to U.S. Provisional Application Ser. No. 62/213,982 filed Sep. 3, 2015, and to U.S. Provisional Application Ser. No. 62/238,278 filed Oct. 7, 2015, the entirety of which are incorporated herein by reference.

BRIEF DESCRIPTION OF THE DRAWINGS

The present disclosure is described in conjunction with the appended figures:

FIGS. 16A-16C illustrate flowcharts of exemplary unconstraining processes and a block diagram of logic for performing the processes according to some embodiments of the present technology.

DETAILED DESCRIPTION

Figure 1:
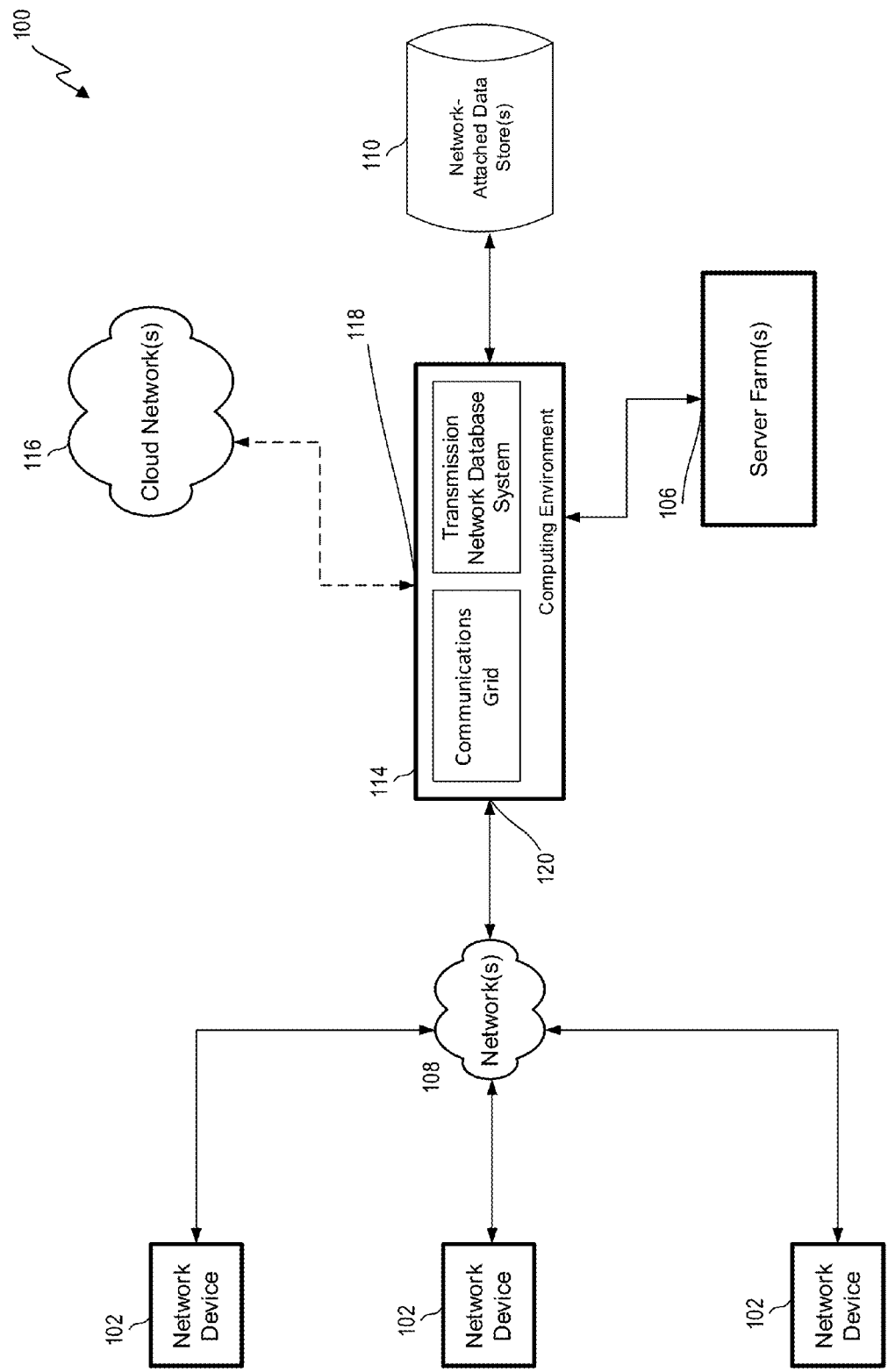
FIG. 1 illustrates a block diagram that provides an illustration of the hardware components of a computing system, according to some embodiments of the present technology.

With general reference to notations and nomenclature used herein, portions of the detailed description that follows may be presented in terms of program procedures executed by a processor component of a machine or of multiple networked machines. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to what is communicated as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include machines selectively activated or configured by a routine stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Systems depicted in some of the figures may be provided in various configurations. In some embodiments, the systems may be configured as a distributed system where one or more components of the system are distributed across one or more networks in a cloud computing system.

FIG. 1 is a block diagram that provides an illustration of the hardware components of a data transmission network 100, according to embodiments of the present technology.

Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
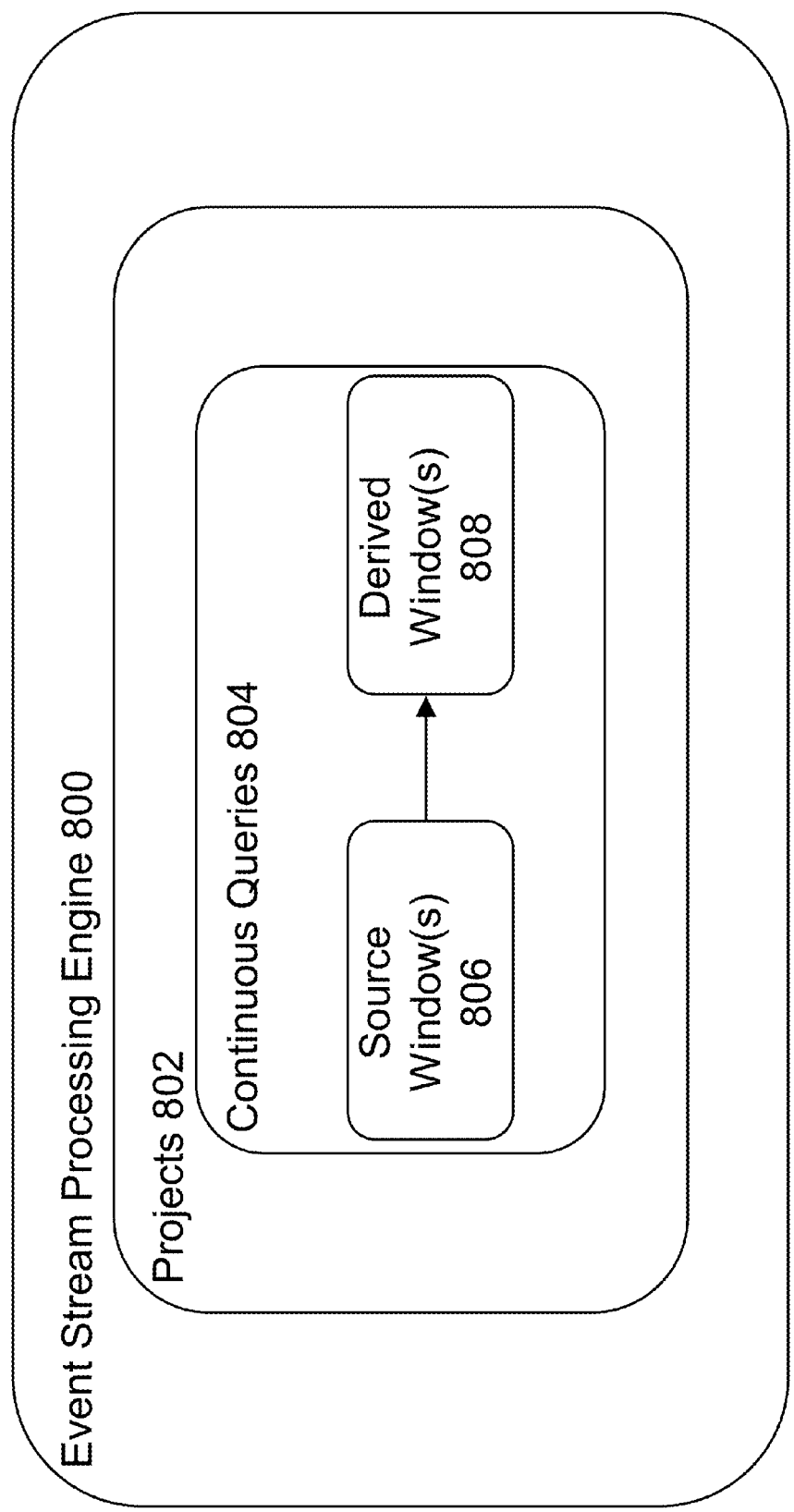
FIG. 8 illustrates a block diagram including components of an Event Stream Processing Engine (ESPE), according to embodiments of the present technology.
Figure 9:
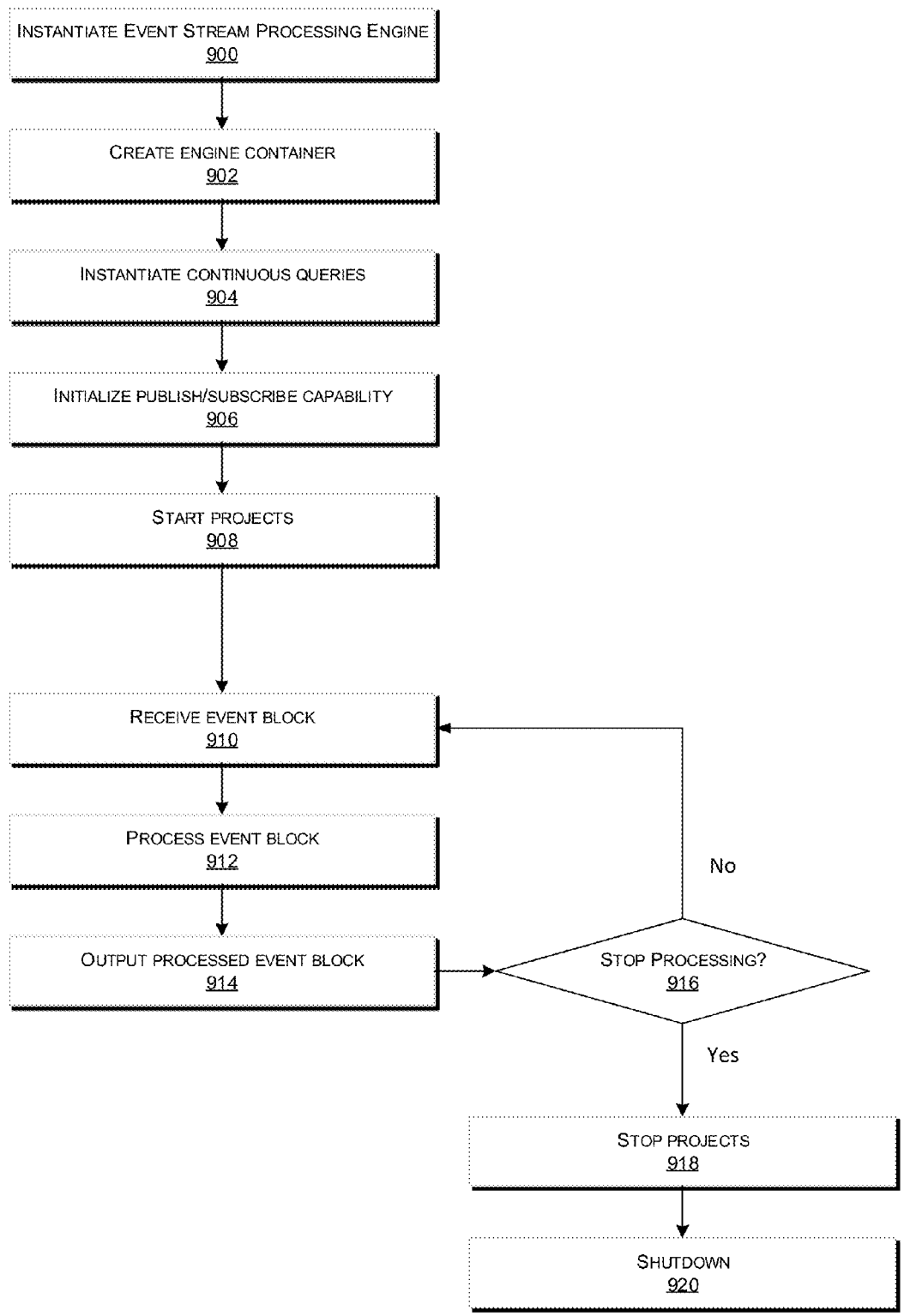
FIG. 9 illustrates a flow chart showing an example process including operations performed by an event stream processing engine, according to some embodiments of the present technology.
Figure 10:
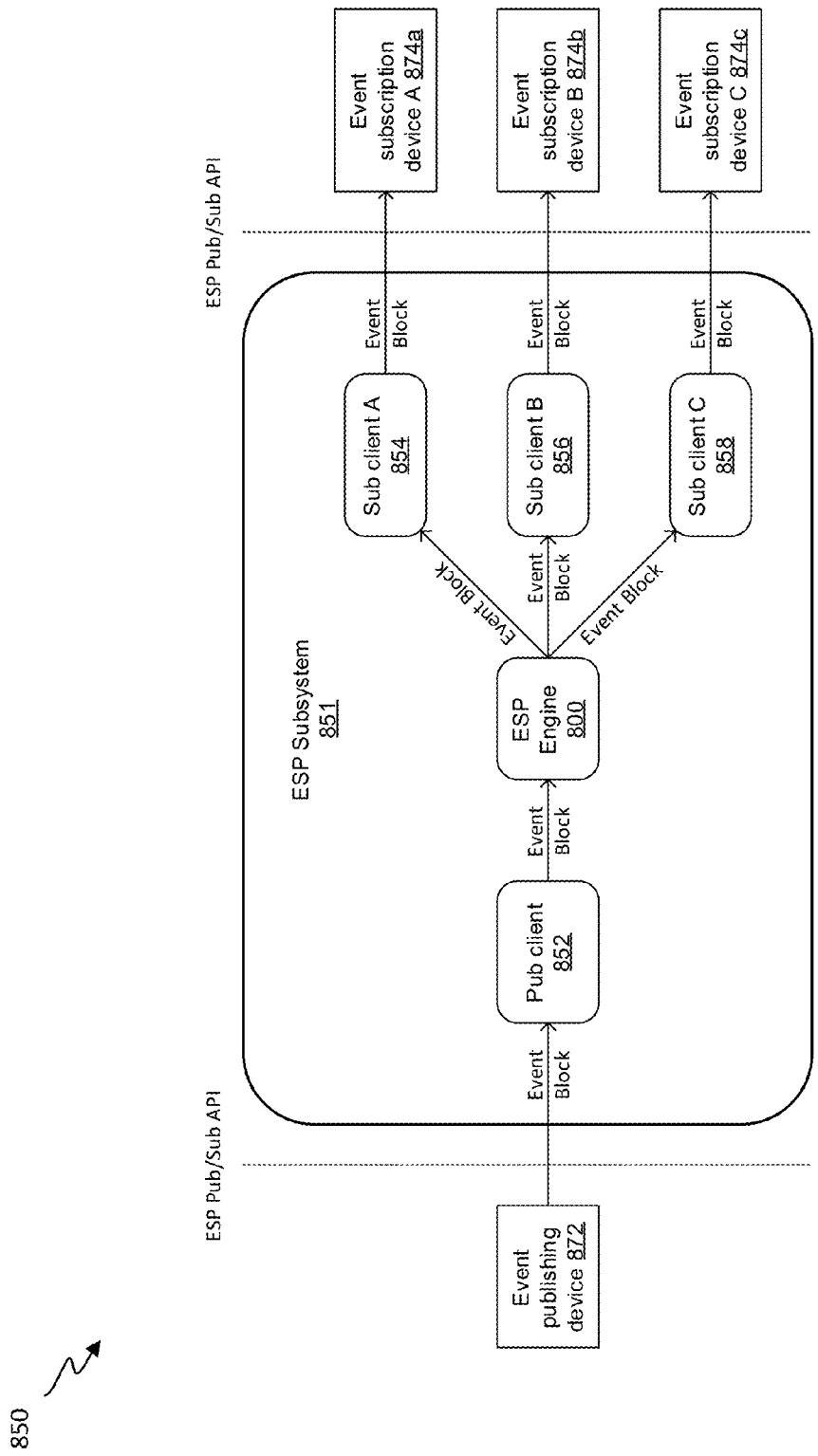
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may comprise one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
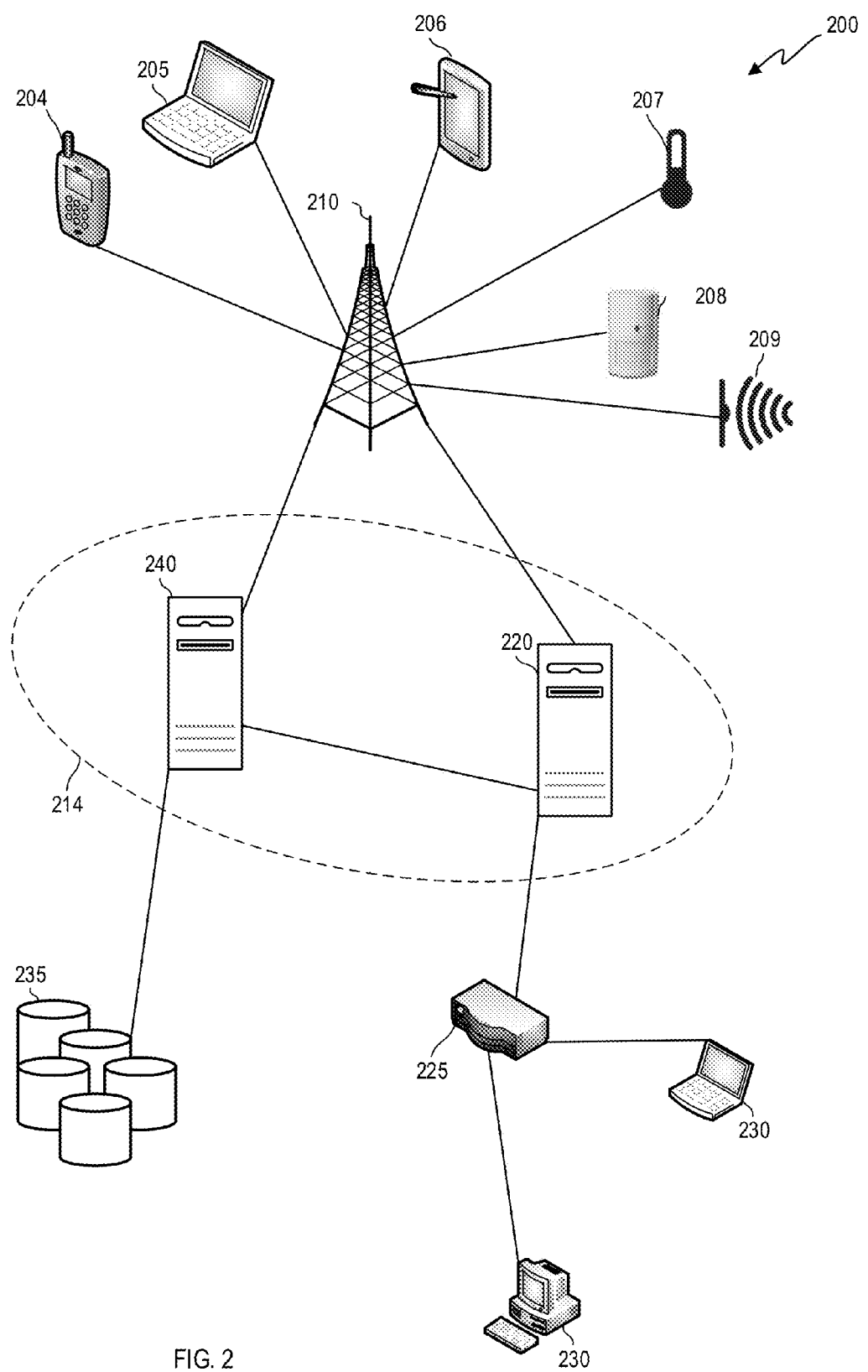
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation).

The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers/users, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
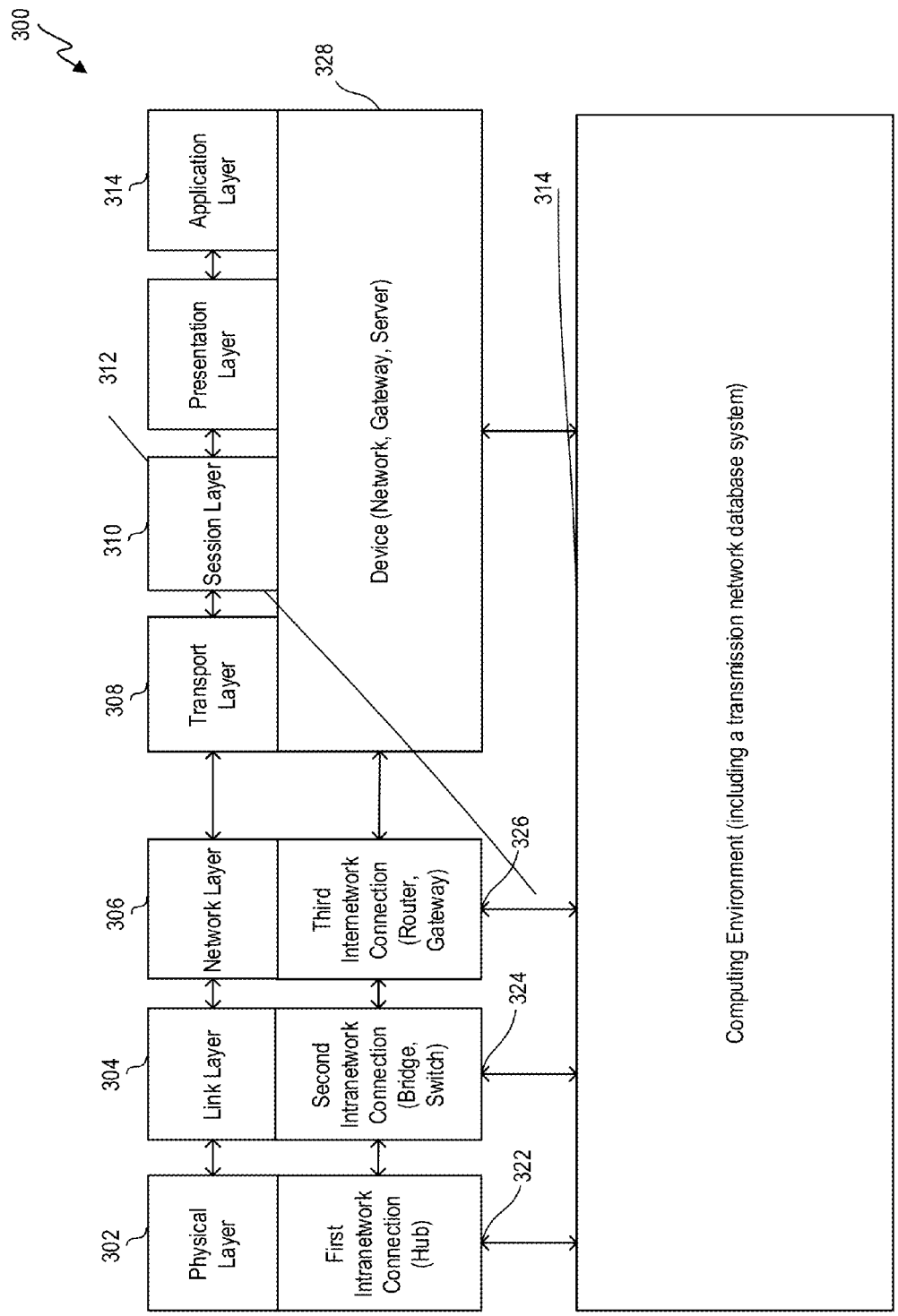
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 302. Physical layer 302 represents physical communication, and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types known to be accepted by an application or network layer.

Application layer 314 interacts directly with software applications and end users, and manages communications between them. Application layer 314 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer, a switch can operate in the physical layer, and a router can operate in the network layer. Inter-network connection components 326 and 328 are shown to operate on higher levels, such as layers 306-314. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
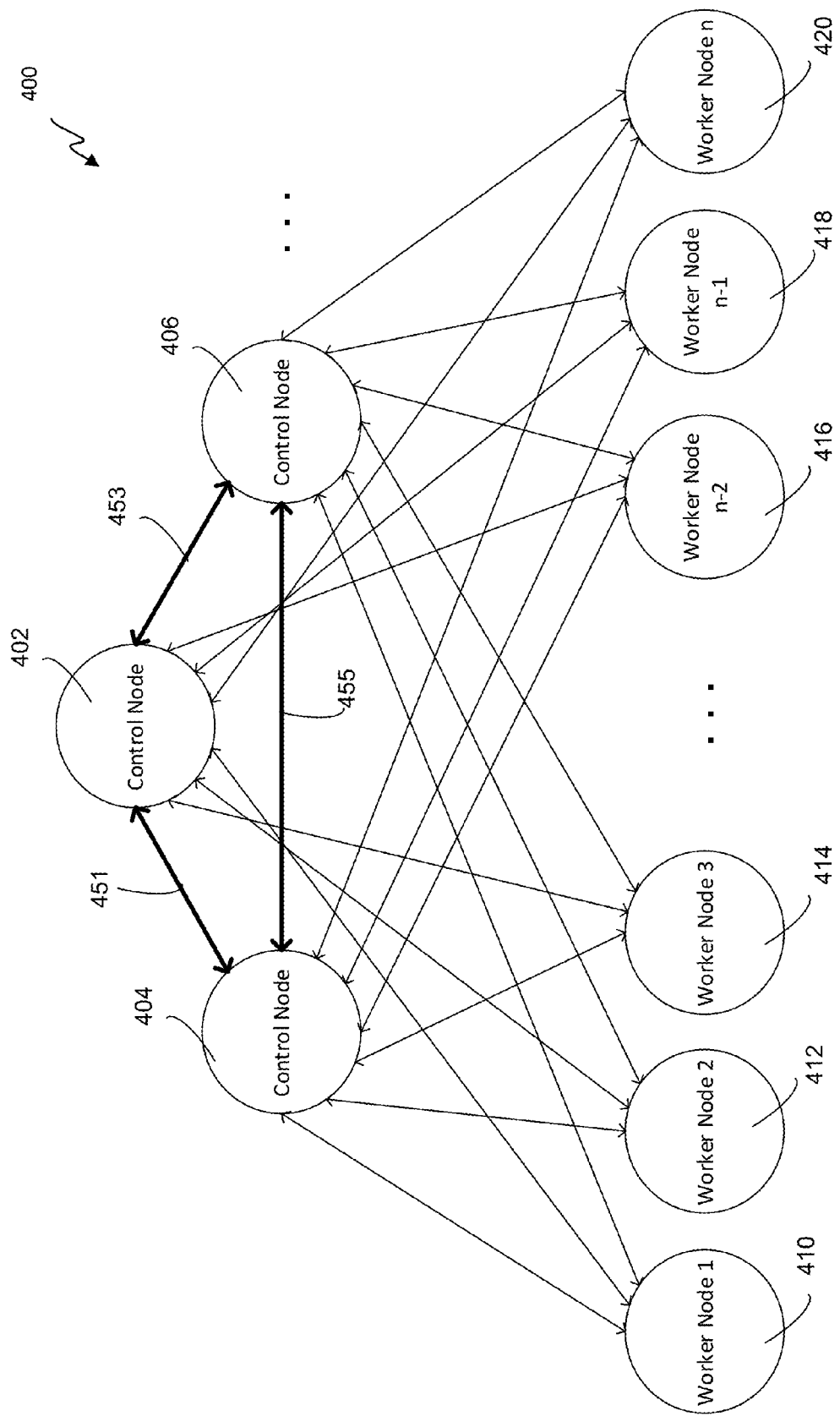
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be receive or stored by a machine other than a control node (e.g., a Hadoop data node).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes). The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
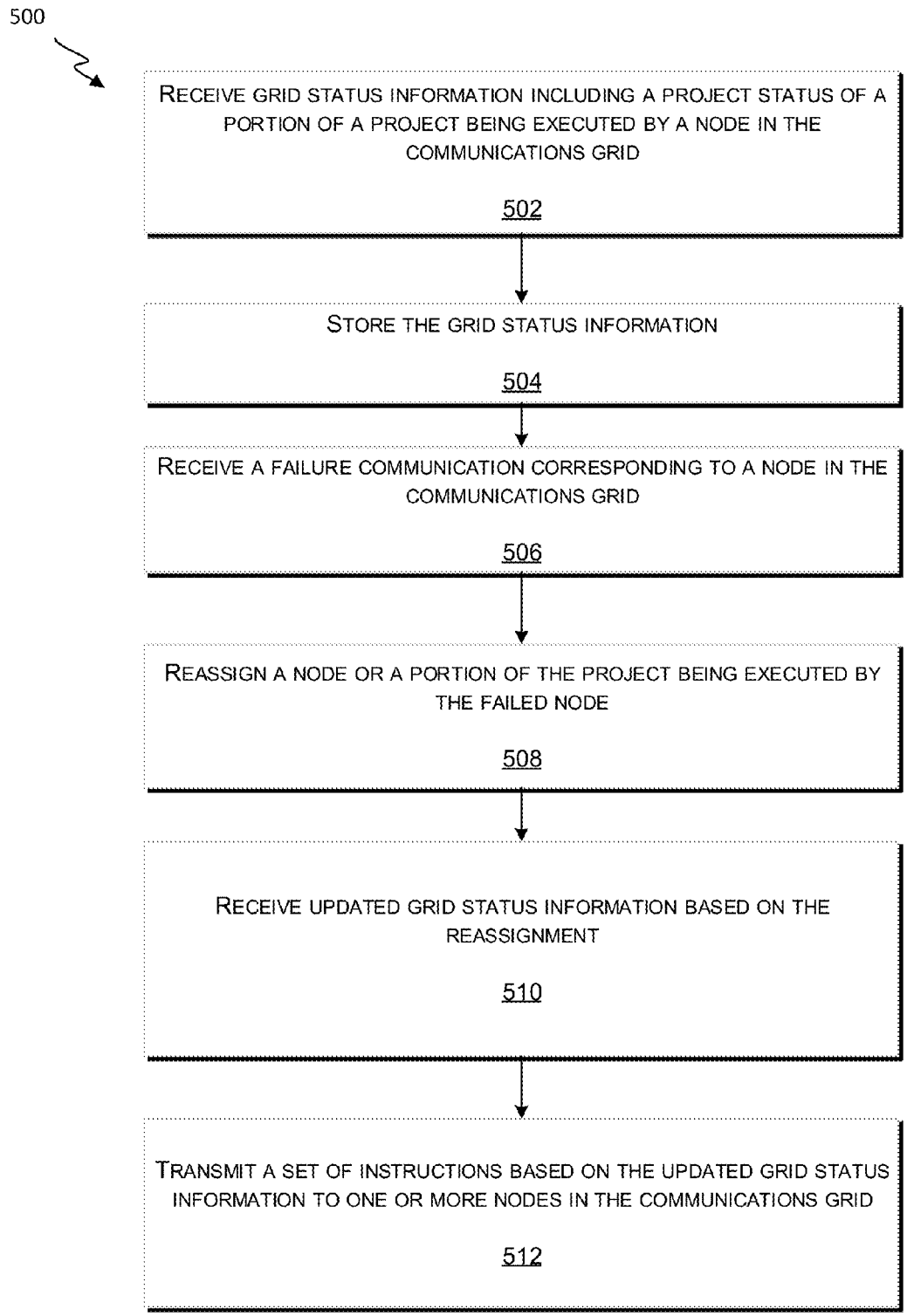
FIG. 5 illustrates a flow chart showing an example process for adjusting a communications grid or a work project in a communications grid after a failure of a node, according to some embodiments of the present technology.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their state stored information.

Figure 6:
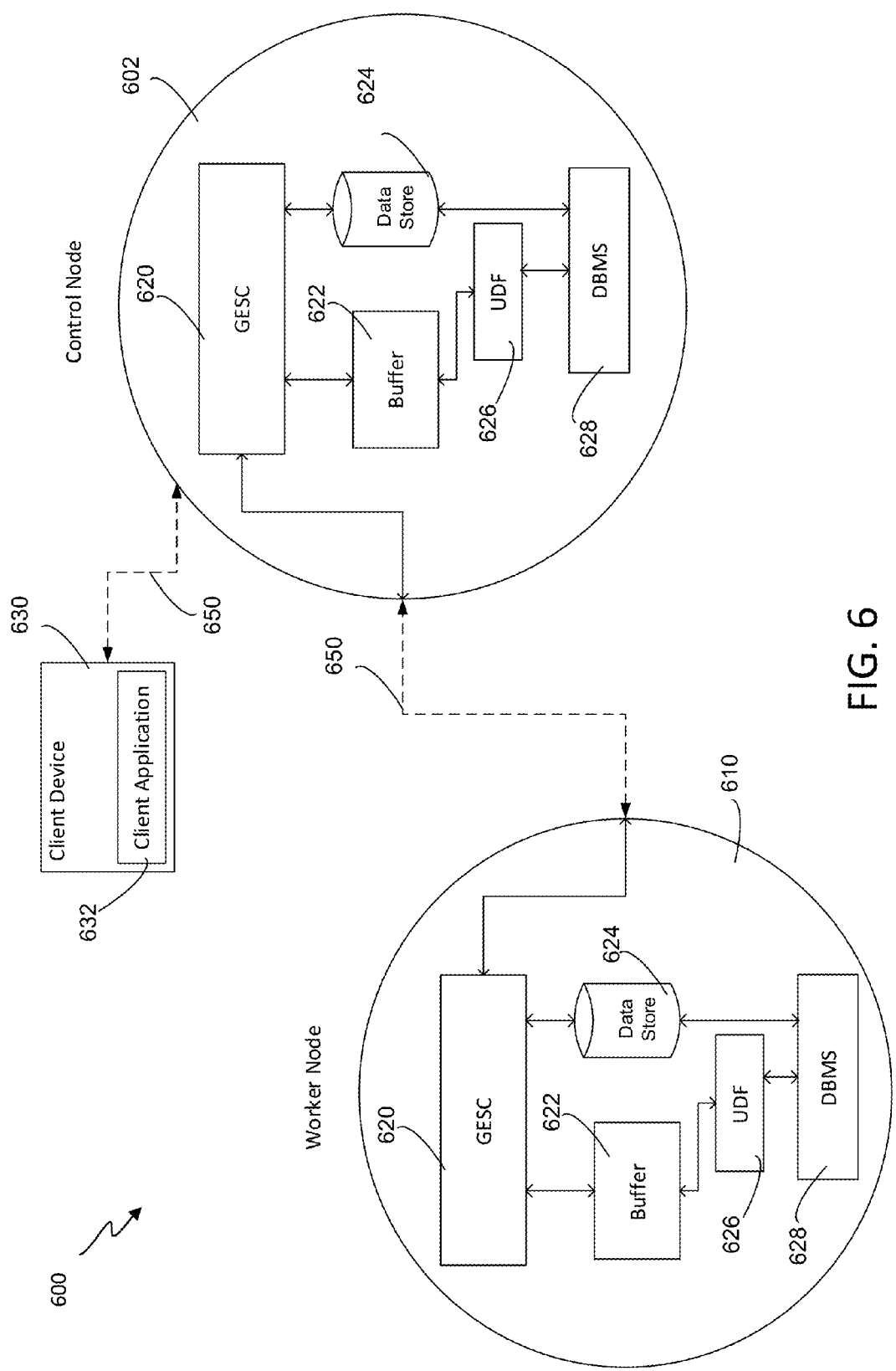
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
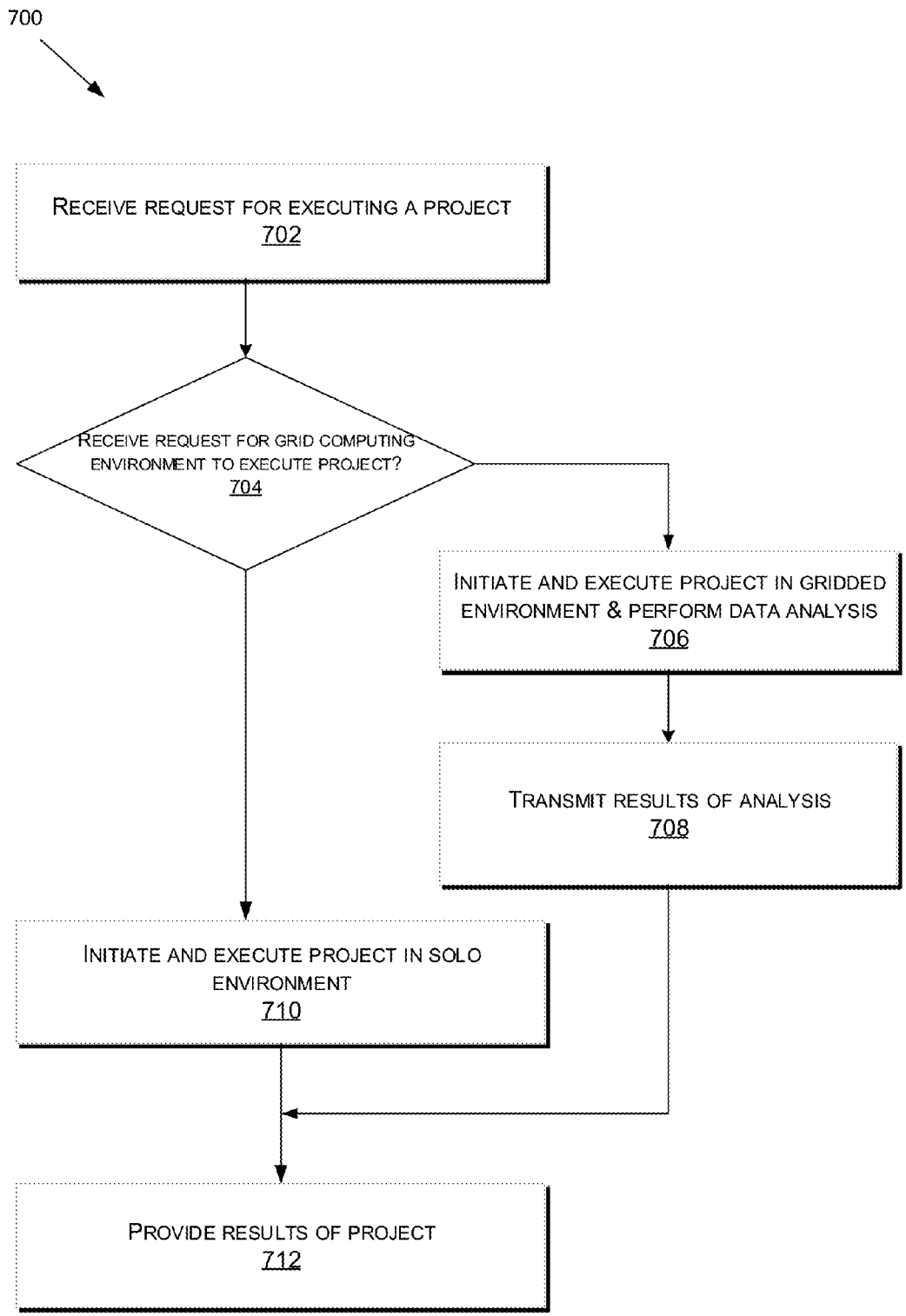
FIG. 7 illustrates a flow chart showing an example process for executing a data analysis or processing project, according to some embodiments of the present technology.

FIG. 7 illustrates a flow chart showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 874a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 850 interfacing between publishing device 872 and event subscribing devices 874a-c, according to embodiments of the present technology. ESP system 850 may include ESP device or subsystem 851, event publishing device 872, an event subscribing device A 874a, an event subscribing device B 874b, and an event subscribing device C 874c. Input event streams are output to ESP device 851 by publishing device 872. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 874a, event subscribing device B 874b, and event subscribing device C 874c. ESP system 850 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 872, to publish event streams into ESPE 800 or an event subscriber, such as event subscribing device A 874a, event subscribing device B 874b, and event subscribing device C 874c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 872, and event subscription applications instantiated at one or more of event subscribing device A 874a, event subscribing device B 874b, and event subscribing device C 874c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 872.

ESP subsystem 800 may include a publishing client 852, ESPE 800, a subscribing client A 854, a subscribing client B 856, and a subscribing client C 858. Publishing client 852 may be started by an event publishing application executing at publishing device 872 using the publish/subscribe API. Subscribing client A 854 may be started by an event subscription application A, executing at event subscribing device A 874a using the publish/subscribe API. Subscribing client B 856 may be started by an event subscription application B executing at event subscribing device B 874b using the publish/subscribe API. Subscribing client C 858 may be started by an event subscription application C executing at event subscribing device C 874c using the publish/subscribe API.

An event block object containing one or more event objects is injected into a source window of the one or more source windows 806 from an instance of an event publishing application on event publishing device 872. The event block object may generated, for example, by the event publishing application and may be received by publishing client 852. A unique ID may be maintained as the event block object is passed between the one or more source windows 806 and/or the one or more derived windows 808 of ESPE 800, and to subscribing client A 854, subscribing client B 806, and subscribing client C 808 and to event subscription device A 874a, event subscription device B 874b, and event subscription device C 874c. Publishing client 852 may further generate and include a unique embedded transaction ID in the event block object as the event block object is processed by a continuous query, as well as the unique ID that publishing device 872 assigned to the event block object.

In an operation 912, the event block object is processed through the one or more continuous queries 804. In an operation 914, the processed event block object is output to one or more computing devices of the event subscribing devices 874a-c. For example, subscribing client A 804, subscribing client B 806, and subscribing client C 808 may send the received event block object to event subscription device A 874a, event subscription device B 874b, and event subscription device C 874c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 872, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

According to exemplary embodiments, the above-described systems may correct censored or constrained historical data. FIGS. 11-13B depict an example in which data is censored or constrained. Although FIGS. 11-13B, as well as several other examples described herein are described in connection with a particular type of resource (e.g., hotel rooms in FIGS. 11-13B), one of ordinary skill in the art will recognize that the present invention is not limited to hotel room allocation. Exemplary embodiments may be employed in connection with any type of limited resource, including non-commercial resources such as seats in a classroom.

Various embodiments described herein are generally directed to methods, mediums, and systems for correcting censored or constrained historical data. The corrected data may be used in forecasting, for example to forecast demand for a limited resource. Real-world physical examples of such limited resources can include hotel rooms, airline seats, parking spaces, autonomous and non-autonomous ride hailing vehicles, seats at a sports event or other show, hospital beds, classroom seating capacity, an amount of allowable patients in clinical research trials, an amount of a mined element available to manufacture an electrical device, an amount of viable wells for oil drilling, etc.

Data is constrained when the data excludes some historical transactions. For example, some customers that would otherwise purchase one of the limited resources may be turned away due to lack of capacity. Thus, if projections are made based on the uncorrected constrained data, the projection will be inaccurate to the extent that it fails to consider the constrained or excluded transactions.

Exemplary embodiments may use several techniques in combination to unconstrain data. In some embodiments, the data is modeled at a higher level of granularity than the individual transaction or supplied resource. For example, instead of modeling the data at the level of an individual record such as a hotel room, data is modeled at a higher hierarchical level, such as for an entire hotel or group of hotels. The aggregated demand may then be pro-rated over a group of categories or customers.

Further, exemplary embodiments may represent the data using a censored regression model that combines multiple effects or indicator variables, in contrast to attempting to model each variable individually or partition the data.

By aggregating and then pro-rating the data, sales to a given category of customers that might be small or nonexistent over a certain time frame may be better accommodated. Moreover, it may be easier or more efficient to make assumptions at the aggregate level, rather than at the user level. This is particularly true when considering a limited resource divided into a number of units. The resource may have, for example, 100 units, and it may be simpler to estimate that about half of the units will be allocated to a certain class of users and half will be allocated to another group of users, rather than trying to make predictions about individual resource units.

By combining effects into one censored regression model, individual effects can be observed in the presence of other effects. This allows effect interactions to be modeled efficiently and accounted for in the model. Moreover, a shared estimate of the variance (sigma hat) can be calculated across a data set.

The output of exemplary embodiments may include one or more of the following: an indication of how much of a resource to make available per user and/or per category of users at a given time; the amount at which the resource will be offered to a user or category at a given time; or an indication of a level of overbooking that will be accommodated for a given user, category, or overall for a given time.

Figure 11:
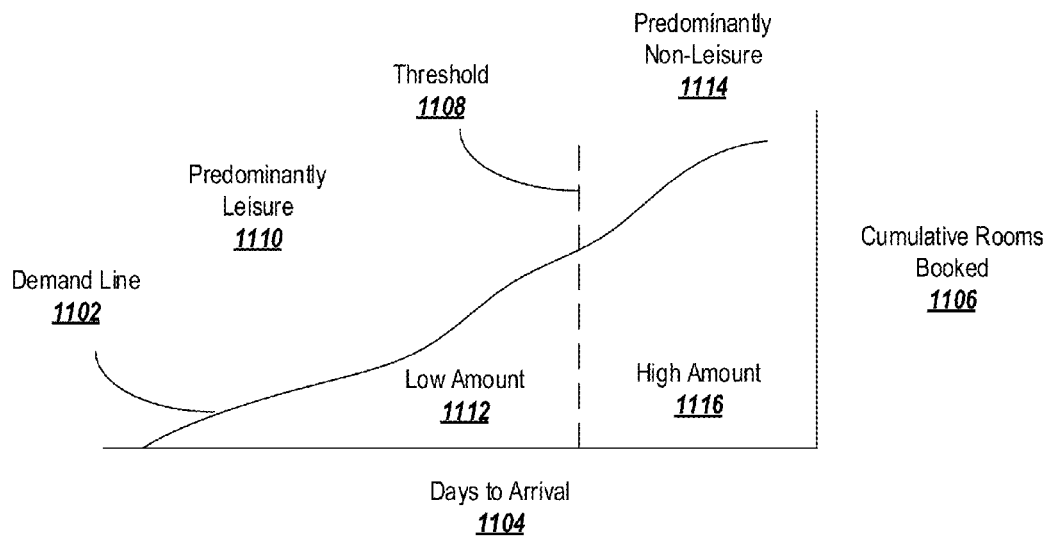
FIG. 11 illustrates a graph of an exemplary demand line for resource unit allocations, according to some embodiments of the present technology.

FIG. 11 is an illustrative graph depicting a demand line 1102 that indicates a number of cumulative bookings 1106 for resource units such as hotel rooms based on the number of days 1104 until the start date of the reservation. As shown in the graph, there is a threshold date 1108, before which demand is predominated by leisure bookings 1110 (e.g., vacation travelers). Because leisure travelers may be less willing to pay high amounts as compared to non-leisure travelers, a low amount region 1112 may be defined prior to the threshold date 1108. Bookings made before the threshold date 1108 may be assumed to be predominated by leisure travelers, and may therefore be charged the low amount. After the threshold date 1108, demand may be predominated by non-leisure bookings 1114. Accordingly, a high amount region 1116 may be defined after the threshold date 1108. Bookings made after the threshold date 1108 may be charged the higher amount.

Figure 12A:
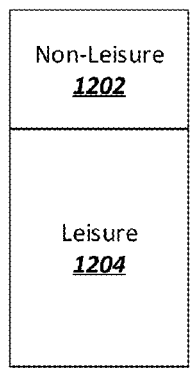
FIGS. 12A-12B illustrate examples of resource allocations in view of exemplary resource unit demand, according to some embodiments of the present technology.
Figure 12A:
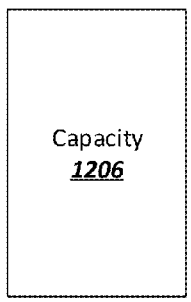
Figure 12B:
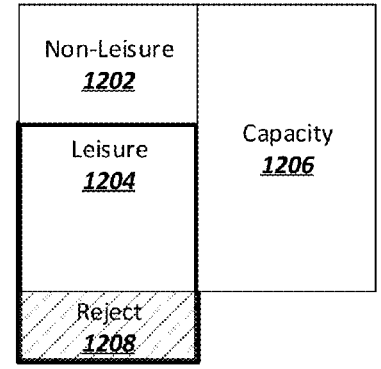

In order to maximize profits, the hotel manager may wish to maximize the number of higher-paying non-leisure travelers that can be accommodated. If the hotel has sufficient capacity, then all of the travelers, non-leisure and leisure, may be allowed to book rooms. However, in some circumstances the hotel may not be able to accommodate all travelers that wish to book rooms, as shown in FIGS. 12A-12B. In this example, there is demand for 120 hotel rooms on a given date. Of this demand, 40 rooms are demanded by non-leisure travelers 1202, who are willing to pay $250 per might. 80 rooms are demanded by leisure travelers 1204, who are willing to pay $150 per night. However, the hotel only has 100 rooms of capacity 1206.

Thus, 20 travelers cannot be accommodated in the hotel. As shown in FIG. 12B, in order to maximize revenue in this scenario the hotel should optimally accept all of the 40 non-leisure travelers 1202. This leaves a pool 1208 of 20 rejected leisure travelers. However, the hotel's booking policy must be properly established in order to achieve this outcome. For example, consider a scenario in which travelers are accepted at the hotel based on a first-come-first-served policy. Because leisure travelers 1202 typically book early, before the non-leisure travelers 1204, the hotel would accept all 80 of the leisure travelers 1204, and would then be forced to reject 20 of the non-leisure travelers 1204.

Accordingly, the hotel manager may wish to stop booking leisure travelers 1204 at a certain point in order to leave room for anticipated future non-leisure travelers 1202. This may be accomplished, for example, by setting the threshold date 1108 (FIG. 11) earlier or later. Such a policy is based on the assumption that leisure travelers 1204 will not pay the higher amount for the hotel room, thus leaving room for non-leisure travelers 1202 who will.

In order to correctly set the policy (i.e., adjusting the threshold date 1108 to the correct point to achieve the desired outcome), historical data may be consulted. However, as shown in FIGS. 13A-13B, the historical data may be constrained or censored in a manner that makes forecasting demand difficult or impossible.

Figure 13A:
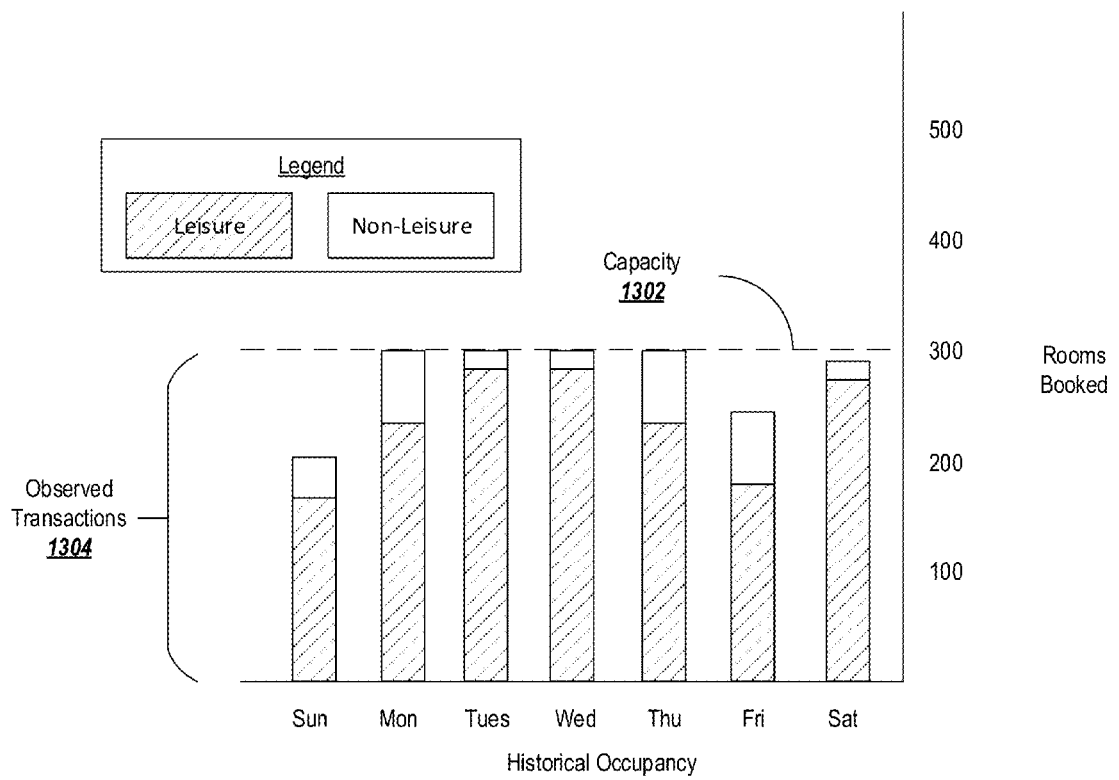
FIGS. 13A-13B illustrate graphs with examples of constrained and unconstrained demand for resource units, respectively, according to some embodiments of the present technology.
Figure 13B:
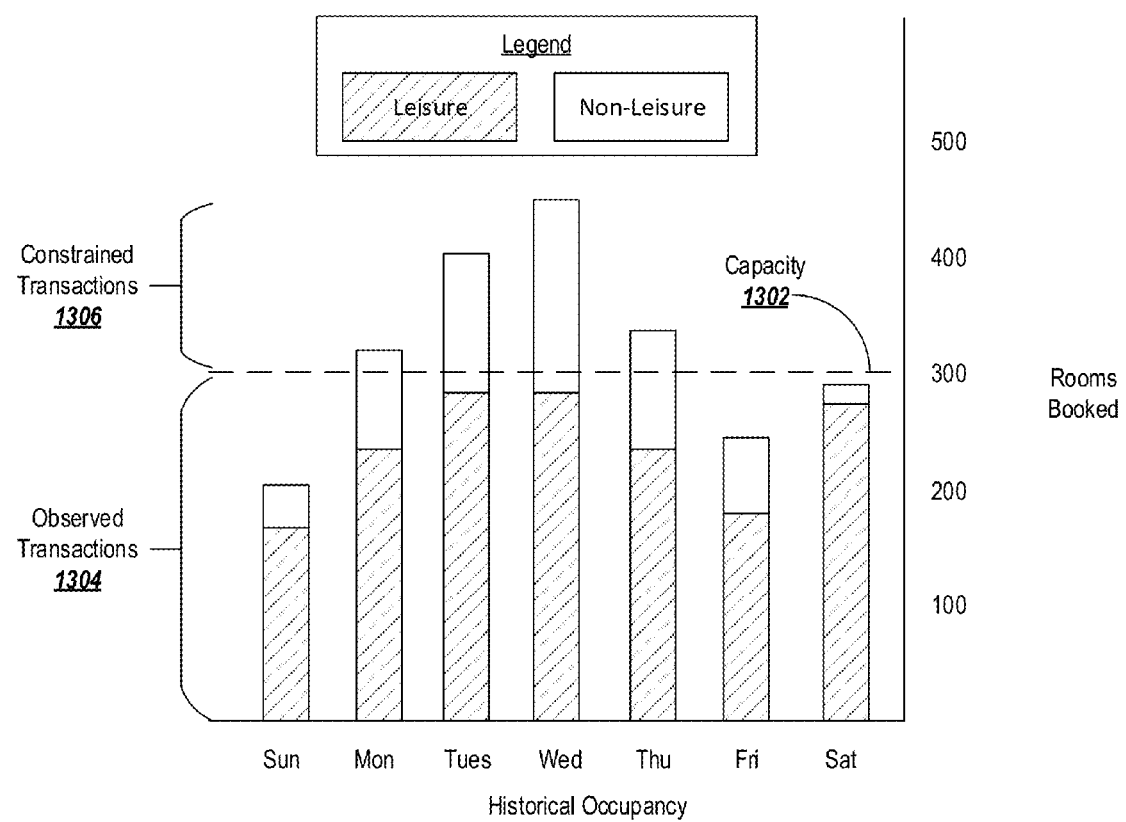

FIG. 13A is a graph showing historical occupancy for the hotel based on the day of the week. As shown, the hotel has a capacity 1302 for 300 guests. On some days of the week, the observed transactions 1304 (e.g., room bookings) do not exceed 300 rooms. For example, on Sunday, Friday, and Saturday, the total number of observed transactions 1304 does not exceed the capacity 1302, and as a result the number of leisure bookings as compared to non-leisure bookings on these days can be accurately determined.

On the other hand, the observed transactions 1304 for Monday through Thursday may have exceeded the total capacity 1302 of the hotel (either the transactions 1304 exceeded the capacity 1302, or fell exactly at the capacity 1302, although it may be difficult or impossible to determine this information solely based on the historical observed transactions). Accordingly, it may be difficult or impossible to predict future demand on the basis of this constrained data. For example, it is not clear (solely on the basis of the graph of FIG. 13A) if there was only slightly more demand than capacity on Monday, or a great deal more demand than capacity.

More generally, a system may require an estimate of future unconstrained demand so that it can properly allocate capacity for a finite resource to the different types of customers (or customer segments) that purchase products from a firm. Observed historical sales may be constrained for several reasons. For example, the firm may have a finite physical capacity for the resources (e.g., a finite number of hotel rooms, rental vehicles, theater seats, etc.). Furthermore, the firm may set booking limits for certain customer segments so that it can reserve capacity for higher paying customer segments.

Returning to the hotel room example, FIG. 13B is a graph showing the number of rooms booked including constrained transactions 1306 that would have been booked if the hotel had sufficient capacity. With this additional information, more precise policies can be set. Exemplary embodiments described herein take a number of observed transactions or records, as shown in FIG. 13A, and unconstrain the data to account for the constrained transactions 1306, as shown in FIG. 13B, in order to forecast future unconstrained demand.

In some embodiments, unconstraining may be done estimating the mean demand under the assumption that demand for a resource is greater than the capacity of the resource. One possibility is to unconstrain directly at the level of the customer segment, resource, or product (e.g., at the level of individual transactions, resource units, or a segment such as non-leisure vs. leisure travelers). However, unconstraining at this level may lead to difficulties. For example, unconstraining combinations (such as segments or categories of customers) in isolation from each other may cause the overall summed unconstrained demand to be unreasonably high from a user acceptance perspective. Moreover, historical data for some combinations may be extremely sparse or intermittent. In these situations, the normal distribution assumption may not hold.

According to exemplary embodiments unconstraining may be performed at a higher hierarchical level, and the unconstrained demand may be redistributed from the higher level to the customer segment, resource, and product level based on proportions of historical data at the same level. For example, instead of modeling the data at the level of an individual record such as a hotel room, data is modeled at a higher hierarchical level, such as for an entire hotel or group of hotels. The aggregated demand may then be pro-rated over a group of categories or customers/users.

By aggregating and then pro-rating the data, sales to a given category of customers/users that might be small or nonexistent over a certain time frame may be better accommodated. Moreover, it may be easier or more efficient to make assumptions at the aggregate level, rather than at the customer/user level. This is particularly true when considering a limited resource such as a hotel room—a hotel may have, for example, 100 rooms, and it may be simpler to estimate that about half of the rooms will be occupied by non-leisure travelers and half will be occupied by leisure travelers, rather than trying to make decisions about individual rooms.

Further, exemplary embodiments may represent the data using a censored regression model that combines multiple effects or indicator variables, in contrast to attempting to model each variable individually or partition the data.

By combining effects into one censored regression model, individual effects can be observed in the presence of other effects. This allows effect interactions to be modeled efficiently and accounted for in the model. Moreover, a shared estimate of the variance (sigma hat) can be calculated across a data set.

The corrected data may be used in forecasting, for example to forecast demand for a limited resource such as hotel rooms, airline seats, parking spaces, seats at a sports event or other show, hospital beds, seats in a classroom, journalists in a particular region, etc.

The output of exemplary embodiments may include one or more of the following: an indication of how much of a resource to make available per user and/or per category of users at a given time; the amount at which the resource will be offered to the customer or category at a given time; or an indication of a level of overbooking that will be accommodated for a given user, category, or overall for a given time.

Figure 14:
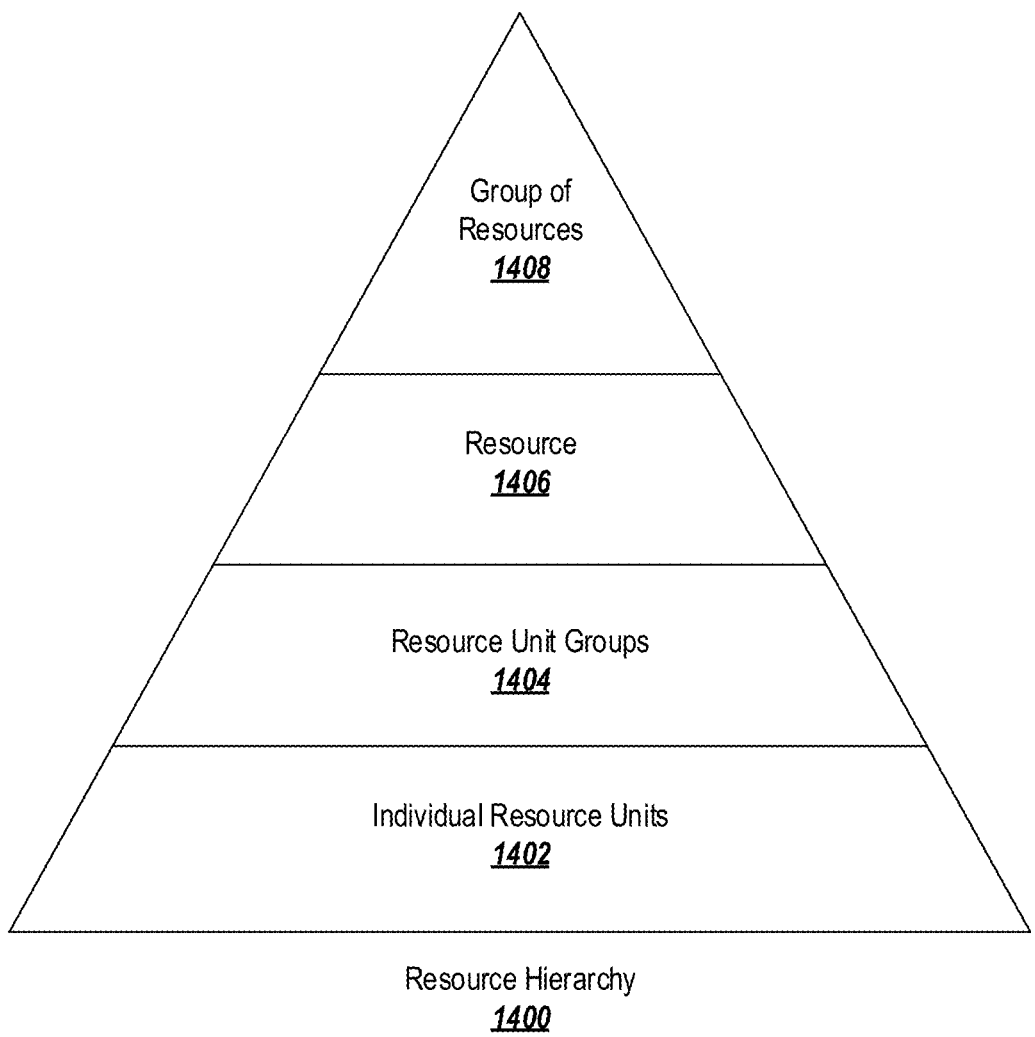
FIG. 14 illustrates an exemplary resource hierarchy, according to some embodiments of the present technology.

FIG. 14 illustrates the concept of a resource hierarchy 1400 relating to a resource divided into a predetermined finite number of units, in more detail. At the bottom (lowest) level of the depicted exemplary hierarchy 1400, individual resource units 1402 may be considered. Individual resource units 1402 may be, for example, individual rooms in a hotel, individual seats in a theater or entertainment venue, seats in a classroom, or individual vehicles in a vehicle rental facility.

At a higher hierarchical level, resource unit groups 1404 may be considered. Resource unit groups may be, for example, room types or market segments in a hotel, seating sections or ticket types in a theater or entertainment venue, classroom types in a school, or a distribution channel (opaque, general retail, international, commercial) or a car class or type in a vehicle rental facility.

At a further higher hierarchical level, the resource 1406 may be considered. Examples of resources 1406 include a hotel property consisting of a number of individual rooms, a theater, a school having a number of classrooms, or a vehicle rental facility.

At the highest level of the illustrated hierarchy 1400 are groups of resources 1408. Groups of resources 1408 may include, for example, groups of hotels, schools in a school district, theaters, or rental facilities across a chain or geographical area.

It is noted that the resource hierarchy 1400 is exemplary only, and that more or fewer hierarchical levels may be provided. Some hierarchical levels may be subdivided; for example, the groups of resources level 1408 may include resources in a geographical area, such as a state, which may be further organized into resources in a larger geographical area, such as a region or country.

Figure 15:
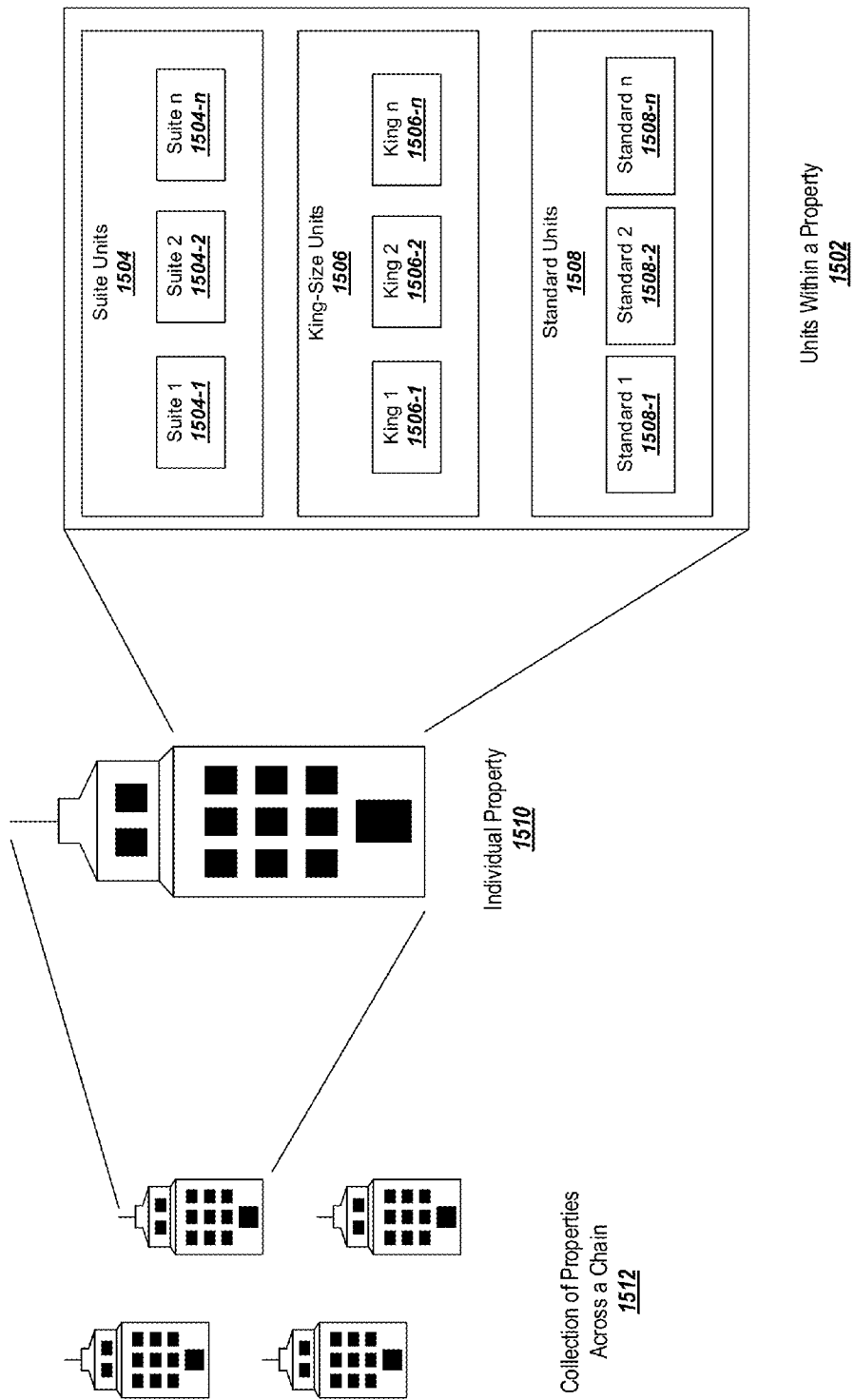
FIG. 15 illustrates an example of units of a resource in a hierarchy, according to some embodiments of the present technology.

FIG. 15 depicts an example of such a hierarchy in the context of the hospitality industry. At a lowest level of the hierarchy are units within a property 1502, representing individual hotel rooms. The hotel rooms may be grouped by room type, which represents a higher level of the hierarchy. For example, the rooms include suites 1504, king-sized rooms 1506, and standard rooms 1508. Each of these rooms is contained within an individual property 1510, which forms the next higher level of the hierarchy. The individual property 1510 may be part of a collection of properties across a chain 1512.

As described in more detail below, exemplary embodiments aggregate demand at a relatively high level of the hierarchy, such as at the level of the resource or groups of resources. At this level, more data is available, and so data for uncommon events are relatively less sparse. Moreover, it may be easier to define characteristics of the data at the higher level than at a lower level. For instance, it may be easier to estimate that, during a conference, about two-thirds of the rooms in a hotel will be booked by non-leisure travelers, rather than estimating that, for any given room there is a 66% chance that the room will be booked by a non-leisure traveler.

FIG. 16A is a flowchart providing a high-level overview of an exemplary logic flow unconstraining process. FIG. 16B depicts exemplary computing modules embodied as instructions stored on a non-transitory computer readable medium 1624 for performing the logic flow described in FIG. 16A. These two figures will be described together below.

At block 1602, a data integration process may be performed. Data integration may involve collecting data from different sources and/or aggregating data regarding units of a resource. For example, records of transactions for individual hotel rooms may be aggregated so that all records for a hotel property are collected together. The data may be aggregated further, for example at the level of groups of the resource (e.g., hotel properties in a certain geographical area). The data integrated at block 1602 may include a number of observed transactions, but may exclude transactions that would have occurred but for a constraint on the transaction (constrained transactions). The integrated data may be processed locally at the device where the data is stored, or may be sent to a separate processing device, such as a cloud processing device. Various examples of data processing and storage devices for this system are shown and described throughout this specification. Block 1602 may be performed by a data integration module 1626 (FIG. 16B).

At block 1604, the data may be unconstrained to account for the constrained transactions. Block 1604 may be performed by an un-constraining module 1628 (FIG. 16B). The unconstraining process may begin at block 1606, where the transactions are accessed. For example, if the integrated data is processed by a remote processing device, the remote processing device may receive the integrated data from one or more data sources and access the received data. If the data is processed by the local computer on which the data is stored, the computer may access the data in local storage.

At block 1608, the processing device may access one or more indicator variables. The indicator variables may be explanatory variables that indicate a demand for units of the resource among customers or users. For example, explanatory variables may include the day of the week, the time of the year, the presence of special events or holidays, etc. Blocks 1606 and 1608 may be performed by an interface module 1630 (FIG. 16B)

At block 1610, the demand for the units of the resource may be modeled at a hierarchical level higher than the units of the resource. For example, demand may be modeled at the level of the resource (e.g., an entire hotel) or groups of the resource. Block 1610 may be performed by a model module 1632 (FIG. 16B).

At block 1612, a censored regression model may be applied to the modeled demand based on the plurality of indicator variables to generate a partial censoring adjusted unconstrained demand. Block 1612 may involve multiplying one or more observations of the indicator variables by one or more regression coefficients for the modeled demand as estimated by a maximum likelihood estimator (MLE).

For example, the censored regression model may be a Tobit model. In such a model, or a given BY group (e.g. lump and room category), let $y_t$ be the observed sold and $y_t^*$ be the unconstrained demand at time t. One example of a Tobit model for unconstrained demand reads as:

$$y_t^* = X_t\beta + \epsilon_t, \epsilon_t \sim N(0,\sigma^2), t=1,\ldots,T \qquad \text{Equation 1}$$

$$y_t = \min(y_t^*, C_t) \qquad \text{Equation 2}$$

where Y is a (T×1) vector of observed sold transactions $y_t$, $Y^*$ is (T×1) vector of unconstrained demand $y_t^*$, X is a (T×p) design matrix of p explanatory indicator variables (including intercept) and $X_t$ is the $t^{th}$ row of X representing the observations of p explanatory variables at time t. β is a (p×1) vector of regression coefficients to be estimated and $C_t$ is the value of censoring if demand is known to be constrained at time t.

Note that, if demand is not constrained then it is equal to observed sold, and $C_t$ is set to infinity (or a larger value than the observed sold). If the only constraining mechanism is the capacity of a resource, then $C_t$ equals the capacity.

The regression model may be customized for different hierarchical levels, and need not represent a fixed hierarchy. For example, the regression model may apply different parameters or assumptions about the underlying data depending on whether it is applied a relatively high level of the hierarchy or a relatively low level of the hierarchy.

At block 1614, a shared variance for the unconstrained data may optionally be calculated. The shared variance may be a variance across the entire set of transactions as retrieved at block 1606.

Blocks 1612 and 1614 may be performed by an analysis module 1634 (FIG. 16B).

At block 1616, the censored regression model may be used to adjust or correct the plurality of records to account for an amount of constrained demand above the maximum cutoff threshold. For example, the partial-censoring-adjusted unconstrained demand may be distributed to a hierarchical level lower than the hierarchical level at which the demand was modeled. Block 1616 may be performed by an unconstraining module 1636 (FIG. 16B).

At block 1618, information relating to the amount of constrained demand may be output. For example, the information may be a corrected number of transactions, calculated regression coefficients, or directly applicable information such as an indication of how many units of the resource to make available per category of users at a given time; an offer to a user or category of users at a given time; and an indication of a level of overbooking that will be accommodated for a given unit of the resource, category, or overall for a given time. The information may, for example, be transmitted to a node device, as described in more detail in connection with FIG. 17.

Block 1618 may be performed by an output module 1638.

At block 1620, the unconstrained historical demand may be used to forecast demand for units of the resource. For example, given past trends as indicated by the unconstrained historical demand, future demand for the units of the resource may be interpolated. Block 1620 may be performed by a forecasting module 1640 (FIG. 16B).

At block 1622, one or more policies may be set based on the forecasted demand, e.g. in order to increase or optimize revenue. For example, the policies may determine how many units of the resource to make available per category of users at a given time; an offer to a user or category of users at a given time; and an indication of a level of overbooking that will be accommodated for a given unit of the resource, category, or overall for a given time. Block 1622 may be performed by an optimizing module 1642 (FIG. 16B)

Figure 16C:
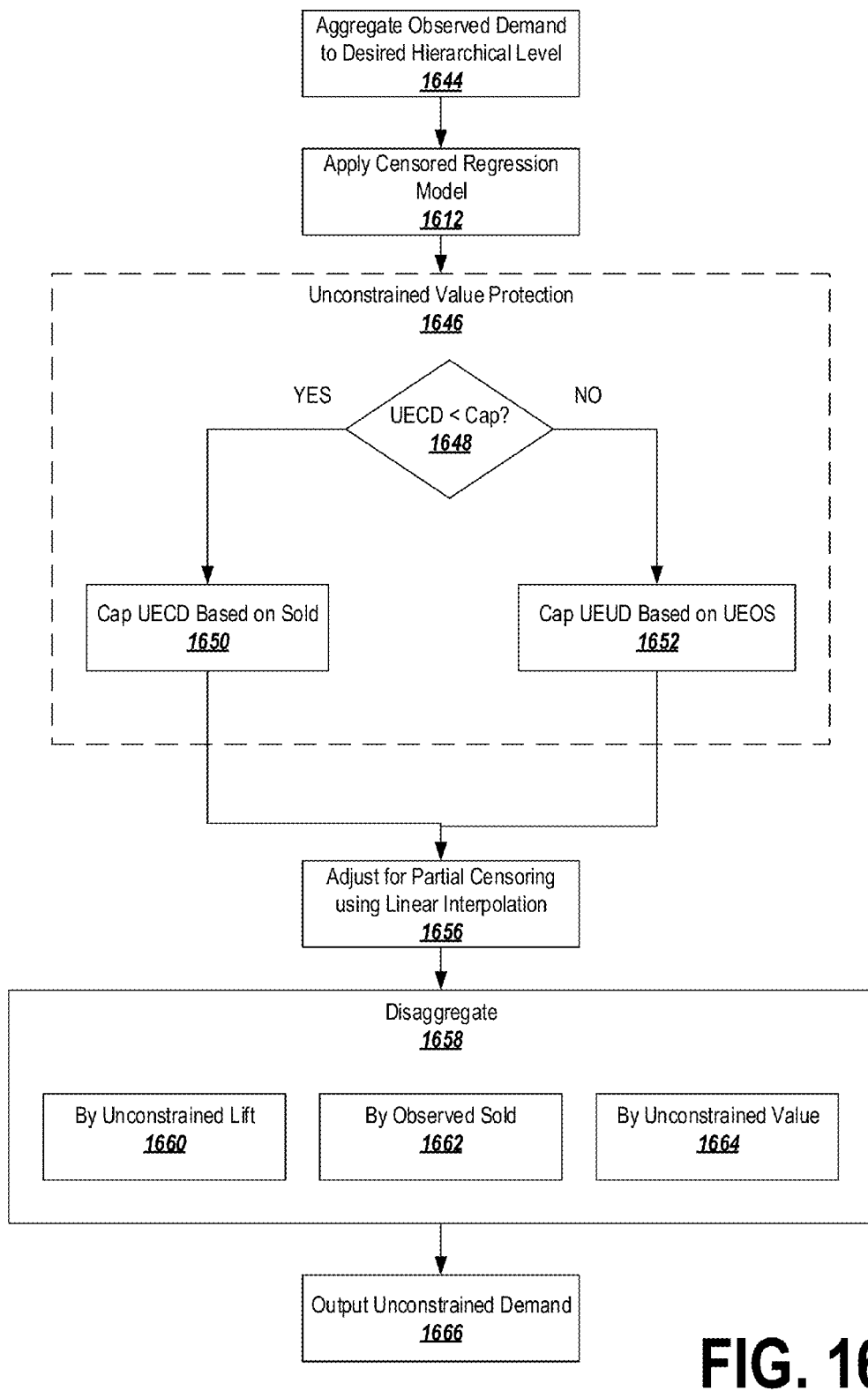

As noted above, application of the censored regression model (block 1612) may involve calculating or estimating a number of variables, which may make use of aggregation, value protection, and adjustment for partial censoring. FIG. 16C depicts these procedures in more detail.

At block 1644, the observed demand across transactions involving units of the resource may be aggregated to a desired hierarchical level (higher than the level of the units of the resource. For example, data for individual resource units may be aggregated across a property or collection of properties in order to achieve aggregated data. Block 1644 may optionally be performed as part of block 1610.

At block 1646, unconstrained value protection may be performed in order to cap the unconstrained expectation of constrained demand (UECD) at a reasonable level. The UECD is the unconditional expectation of constrained demand (Y*) under the assumption that the underlying distribution for constrained demand is right censored. This expectation can be obtained by estimating the Tobit model using maximum likelihood estimator (MLE). Let $\hat{\beta}$ is the vector of estimated coefficients via MLE then unconditional expectation of constrained demand can be written as $$E(y_t^*|X_t)=X_t\hat{\beta} \qquad \text{Equation 3}$$

If there are no explanatory variables then this expectation corresponds to the final iterated estimate for the mean of the unconstrained demand for the expectation-maximization (EM) algorithm $$E(y_t^*|X_t)=\mu^{(k)}=\mu^{new} \qquad \text{Equation 4}$$

where k is the maximum number of iterations or the final iteration that satisfies the stopping criteria.

In general, block 1646 determines if the UEUD is lower than a capped value (block 1648, where $\kappa \geq 1$ is the threshold multiplier for applying a capping rule, as shown below) and, if so, caps the UEUD based on the actual resource units sold (block 1650). Otherwise, block 1646 caps based on unconditional expectation of the observed sold (UEOS, block 1652).

The UEOS may be defined as the unconditional expectation of observed sold (Y) under the assumption that the observed sold is equal to the constrained demand, and the underlying distribution is mis-specified such that all constrained demand is not censored.

This expectation can be obtained by simply regressing observed sold on the explanatory variables using ordinary least squares (OLS):

$$E(y_t|X_t)=X_t\hat{\beta}^{OLS} \qquad \text{Equation 5}$$

where $\hat{\beta}^{OLS}$ is the estimated coefficients via OLS.

If there are no explanatory variables then this corresponds to the initial estimate for the mean of the observed sold for the EM algorithm:

$$E(y_t|X_t)=\mu^{(0)}=\mu^{old} \qquad \text{Equation 6}$$

The determinations at blocks 1648-1652 may be summarized as:

$$\hat{y}_t^* = \begin{cases} \min(E(y_t^*|X_t, y_t^*>C_t), \kappa y_t) & \kappa y_t > E(y_t^*|X_t) \\ \min(E(y_t^*|X_t, y_t^*>C_t), \\ \max(\kappa\max(E(y_t|X_t), 0), y_t)) & \kappa y_t \leq E(y_t^*|X_t) \end{cases} \qquad \text{Equation 7}$$

or $$\hat{y}_t^* = \begin{cases} \min(X_t\hat{\beta}+\hat{\sigma}\hat{\lambda}_t, \kappa y_t) & \kappa y_t > X_t\hat{\beta} \\ \min(X_t\hat{\beta}+\hat{\sigma}\hat{\lambda}_t, \\ \max(\kappa\max(X_t\hat{\beta}^{OLS}, 0), y_t)) & \kappa y_t \leq X_t\hat{\beta} \end{cases} \qquad \text{Equation 8}$$

Optionally, $X_t\hat{\beta}^{OLS}$ may be replaced by $X_t\hat{\beta}^{OLS}+\hat{\sigma}^{OLS}\hat{\lambda}_t^{OLS}$ in order to accommodate for the conditional expectation of constrained demand (CECD). This is the conditional expectation of constrained demand (Y*) when it is known to be censored and under the assumption that the underlying distribution for constrained demand is right censored.

This expectation can be obtained by estimating the Tobit model using maximum likelihood estimator.

$$E(y_t^*|X_t, y_t^*>C_t)=X_t\hat{\beta}+\hat{\sigma}\hat{\lambda}_t \qquad \text{Equation 9}$$

where $\hat{\lambda}_t$ is estimated as $$\hat{\lambda}_t = \frac{\phi\left(\frac{c_t-x_t\hat{\beta}}{\hat{\sigma}}\right)}{1-\Phi\left(\frac{c_t-x_t\hat{\beta}}{\hat{\sigma}}\right)} \qquad \text{Equation 10}$$

where $\phi$ is the density and $\Phi$ is the cumulative distribution functions of standard normal distribution.

If there are no explanatory variables then this corresponds to the last conditional expectation of the unconstrained demand.

$$E(y_t^*|X_t, y_t^*>C_t)=\mu^{(k-1)}+\tilde{\sigma}^{(k-1)}\tilde{\lambda}_t^{(k-1)}=\mu_{new}+\tilde{\sigma}^{(k-1)}\tilde{\lambda}_t^{(k-1)} \qquad \text{Equation 11}$$

where $\tilde{\lambda}^{(k-1)}$ is the $k^{th}$ iteration of EM algorithm and estimated as $$\tilde{\lambda}_t^{(k-1)} = \left[ \frac{\phi\left(\frac{c_t - \mu^{(k-1)}}{\hat{\sigma}^{(k)}}\right)}{1 - \Phi\left(\frac{c_t - \mu^{(k-1)}}{\hat{\sigma}^{(k-1)}}\right)} \right] \quad \text{Equation 12}$$

If no capping protection is desired in block 1646, then $$\hat{y}_t^* = X_t\hat{\beta} + \hat{\sigma}\hat{\lambda}_t \quad \text{Equation 13}$$

At block 1656, a partial censoring adjustment may be applied. The partial censoring adjustment may adjust for partial censoring by applying linear interpolation to the data.

At block 1658, unconstraining lift may be disaggregated back down to the lower hierarchical levels. In other words, unconstraining lift, defined as the difference between protected-and-partial-censoring-adjusted unconstrained value and the observed sold, may be distributed at the aggregate level:

$$L_t^H = \Sigma \hat{y}_t^* - \Sigma y_t \quad \text{Equation 14}$$

Prorates for this formula may be computed, e.g., based on one of the following methods: (1) The difference between protected and partial censoring adjusted unconstrained value of constrained demand $\hat{y}_t^*$ and the observed sold at the LOW level (block 1660), i.e., $$\delta_t \hat{y}_t^* - y_t \quad \text{Equation 15}$$

(2) Observed sold $y_t$ (block 1662); or (3) protected and partial censoring adjusted unconstrained value of constrained demand $\delta_t \hat{y}_t^*$ at the LOW level (block 1664).

At block 1666, the unconstrained demand, e.g., a correction factor for correcting the observed constrained reactions based on the operations performed in block 1612, may be returned.

Figure 17:
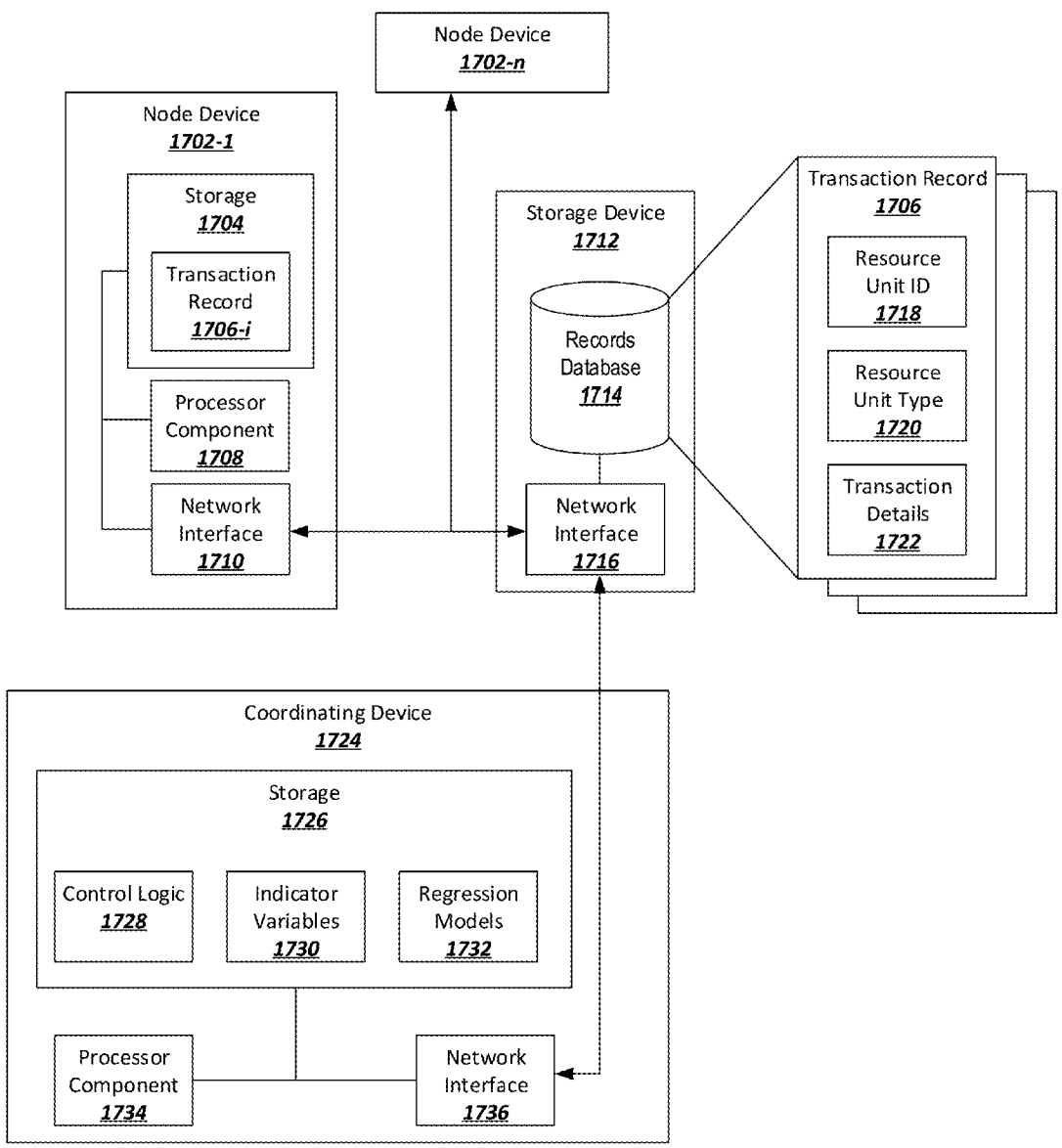
FIG. 17 illustrates an exemplary block diagram of a system suitable for practicing exemplary embodiments, according to some embodiments of the present technology.

The above-described techniques may be performed in a distributed system, in which records of individual transactions are stored at one or more locations and processed remotely. FIG. 17 illustrates an exemplary block diagram of a distributed system suitable for practicing exemplary embodiments, according to some embodiments of the present technology.

The system includes one or more node devices 1702-1, . . . 1702-n. The node devices may be, for example, computing devices that store transaction records 1706-i for a given resource, such as a hotel. The transaction records 1706-I may be stored in a storage 1704. The node devices 1702 may further include a processor component 1708 for reading and writing the transactions records 1706-i in the storage 1704 and for interacting with a network interface 1710 to receive and respond to network requests for data, among other possibilities.

The node devices 1702 may optionally interact with each other, and/or may interact with a storage device 1712 via the storage device's network interface 1716. The storage device 1712 may store the collective transaction records 1706 from the node devices 1702 in a records database 1714. The transaction records 1706 may include (in an exemplary embodiment), a resource unit ID 1718 which identifies a particular unit of a resource to which this transaction pertains. The transaction records 1706 may further include a resource unit type 1720, which assigns the resource unit to one or more of a plurality of categories (e.g., king-size room, standard room, suite). The transaction records 1706 may also include other details of the transaction 1722, such as the date on which the transaction was carried out, the date of the reservation for the unit of the resource, the amount assigned to the transaction, etc.

A coordinating device 1724 may retrieve the transaction records 1706 and may perform unconstraining operations to unconstrain the data. The coordinating device 1724 may request and retrieve the records from the storage device 1712 using the coordinating device's network interface 1736. A processor component 1734 may be programmed with instructions to unconstrain the data, such as instructions for performing the operations depicted in FIGS. 16A and 16C.

The coordinating device 1724 may store various structures and instructions to allow the processor component to perform these operations. For example, the storage 1726 may store control logic 1728 implementing the modules depicted in FIG. 16B. The storage 1726 may further store a set of the above-described indicator variables 1730, and one or more regression models 1732. The regression models 1732 may include logic or formulae, such as those described above, for performing a Tobit regression to unconstrain the transaction records 1706.

In various embodiments, each of the processor components 1708, 1734 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are linked.

By way of example, the processor components 1708, 1734, etc. may incorporate a single-instruction multiple-data (SIMD) architecture, may incorporate multiple processing pipelines, and/or may incorporate the ability to support multiple simultaneous threads of execution per processing pipeline.

In various embodiments, each of the storages 1704, 1712, and 1726 may be based on any of a wide variety of information storage technologies, including volatile technologies requiring the uninterrupted provision of electric power, and/or including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the network interfaces 1710, 1716, and 1736 may employ any of a wide variety of communications technologies enabling these devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ timings and/or protocols conforming to any of a variety of industry standards, including without limitation, RS-232C, RS-422, USB, Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11b, 802.11g, 802.11x, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, 5G, etc.

In some embodiments, an apparatus may include a processor and a storage to store instructions that, when executed by the processor, cause the processor to access a plurality of records from one or more storage devices. The plurality of records may be associated with a resource divided into a predetermined number of units, where the plurality of records are subject to a maximum cutoff threshold above which further records are not created. At least the resource and the units may form a hierarchy. Within the hierarchy, a lower hierarchical level may correspond to the units and a higher hierarchical level may correspond to the resource.

The instructions may further cause the processor to access a plurality of indicator variables that indicate a demand for a plurality of units of the resource among a plurality of users.

The instructions may further cause the processor to model demand for the plurality of units of the resource by the plurality of users at a hierarchical level higher than the units of the resource. In some embodiments, the hierarchical level may correspond to the resource divided into the predetermined number of units, or to a group of properties comprising the resource divided into the predetermined number of units.

The instructions may further cause the processor to apply a censored regression model to the modeled demand based on the plurality of indicator variables to generate a partial censoring adjusted unconstrained demand, the applying comprising multiplying one or more observations of the indicator variables by one or more regression coefficients for the modeled demand as estimated by a maximum likelihood estimator (MLE). The regression model may account for the plurality of indicator variables individually, or together as a group. The regression model may be customized to provide different models for different hierarchical levels of the resource.

The instructions may further cause the processor to use the censored regression model to adjust the plurality of records to account for an amount of constrained demand above the maximum cutoff threshold by distributing the partial-censoring-adjusted unconstrained demand to a hierarchical level lower than the hierarchical level at which the demand was modeled.

When accounting for the constrained demand, the processor may perform unconstrained value protection. In some embodiments, performing unconstrained value protection may involve capping an unconstrained expectation of constrained demand ("UECD") based on a number of units of the resource that have been sold, or based on an unconditional expectation of observed sold ("UEOS") units.

The instructions may further cause the processor to transmit information relating to the amount of constrained demand. For example, the information may be transmitted to a node device. In some embodiments, the processor may output one or more of: an indication of how many units to make available per category of users at a given time; an offer to a user or category of users at a given time; and an indication of a level of overbooking that will be accommodated for a given unit of the resource, category of users, or overall for a given time.

In some embodiments, the plurality of records may be aggregated over the resource and the modeled demand may be pro-rated over the plurality of users. In some embodiments, the processor may calculate a shared estimate for a variance across the plurality of transactions. In some embodiments, the processor may adjust for partial censoring using linear interpolation.

In some embodiments, a computer-implemented method may include accessing a plurality of records from one or more storage devices. In some embodiments, a computer-program product tangibly embodied in a non-transitory machine-readable storage medium may include instructions operable to cause a processor component to access a plurality of records from one or more storage devices. The plurality of records may be associated with a resource divided into a predetermined number of units, where the plurality of records are subject to a maximum cutoff threshold above which further records are not created. At least the resource and the units may form a hierarchy. Within the hierarchy, a lower hierarchical level may correspond to the units and a higher hierarchical level may correspond to the resource.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus comprising:
a processor; and
a storage to store instructions that, when executed by the processor, cause the processor to:
access a plurality of records from one or more storage devices, the plurality of records associated with a resource divided into a predetermined number of units, the plurality of records subject to a maximum cutoff threshold above which further records are not created, at least the resource and the units forming a hierarchy having higher hierarchical level corresponding to the resource and a lower level corresponding to a disaggregation of the higher hierarchical level into units of the resource;
access a plurality of indicator variables that indicate a demand for a plurality of units of the resource among a plurality of users;
model demand for the plurality of units of the resource by the plurality of users at a hierarchical level higher than the lower level corresponding to the units of the resource;
apply a censored regression model to the modeled demand based on the plurality of indicator variables to generate a partial censoring adjusted unconstrained demand, the applying comprising multiplying one or more observations of the indicator variables by one or more regression coefficients for the modeled demand as estimated by a maximum likelihood estimator (MLE);
use the censored regression model to adjust the plurality of records to account for an amount of constrained demand above the maximum cutoff threshold by distributing the partial-censoring-adjusted unconstrained demand to a hierarchical level lower than the hierarchical level at which the demand was modeled; and
transmit or store information relating to the amount of constrained demand.

2. The apparatus of claim 1, wherein the hierarchical level corresponds to the resource divided into the predetermined number of units, or to a group of properties comprising the resource divided into the predetermined number of units.

3. The apparatus of claim 1, wherein the regression model accounts for the plurality of indicator variables together as a group.

4. The apparatus of claim 1, wherein the plurality of records are aggregated over the resource and the modeled demand is pro-rated over the plurality of users.

5. The apparatus of claim 1, further storing instructions configured to cause the one or more processors to calculate a shared estimate for a variance across the plurality of transactions.

6. The apparatus of claim 1, wherein the instructions are further configured to cause the processor component to output one or more of: an indication of how many units to make available per category of users at a given time; an offer to a user or category of users at a given time; and an indication of a level of overbooking that will be accommodated for a given unit of the resource, category of users, or overall for a given time.

7. The apparatus of claim 1, wherein the censored regression model is customized to provide different models for different hierarchical levels of the resource.

8. The apparatus of claim 1, further storing instructions for performing unconstrained value protection when accounting for the amount of constrained demand.

9. The apparatus of claim 8, wherein the performing unconstrained value protection comprises capping an unconstrained expectation of constrained demand ("UECD").

10. The apparatus of claim 1, further storing instructions for adjusting for partial censoring using linear interpolation.

11. A computer-program product tangibly embodied in a non-transitory machine-readable storage medium, the computer-program product including instructions operable to cause a processor component to perform operations including:
accessing a plurality of records from one or more storage devices, the plurality of records associated with a resource divided into a predetermined number of units, the plurality of records subject to a maximum cutoff threshold above which further records are not created, at least the resource and the units forming a hierarchy having a higher hierarchical level corresponding to the resource and a lower level corresponding to a disaggregation of the higher hierarchical level into units of the resource;
accessing a plurality of indicator variables that indicate a demand for a unit of the resource among a plurality of users;
modeling demand for the units of the resource by the plurality of users at a hierarchical level higher than the lower level corresponding to the units of the resource;
applying a censored regression model to the modeled demand based on the plurality of indicator variables to generate a partial-censoring-adjusted unconstrained demand, the applying comprising multiplying one or more observations of the indicator variables by one or more regression coefficients for the modeled demand as estimated by a maximum likelihood estimator (MLE);
using the censored regression model to adjust the plurality of records to account for an amount of constrained demand above the maximum cutoff threshold by distributing the partial-censoring-adjusted unconstrained demand to a hierarchical level lower than the hierarchical level at which the demand was modeled; and
transmitting information relating to the amount of constrained demand.

12. The computer-program product of claim 11, wherein the hierarchical level corresponds to the resource including the predetermined number of units, or a group of properties including the resource.

13. The computer-program product of claim 11, wherein the regression model accounts for the plurality of indicator variables together as a group.

14. The computer-program product of claim 11, wherein the plurality of transactions are aggregated over the resource and the analysis module pro-rates the modeled demand over the plurality of users.

15. The computer-program product of claim 11, further storing instructions configured to cause the one or more processors to calculate a shared estimate for a variance across the plurality of records.

16. The computer-program product of claim 11, wherein the instructions are further configured to cause the one or more processors to output one or more of: an indication of how many units to make available per category of users at a given time; an offer to a user or category of users at a given time; and an indication of a level of overbooking that will be accommodated for a given unit of the resource, category, or overall for a given time.

17. The computer-program product of claim 11, wherein the censored regression model is customized to provide different models for different hierarchical levels of the resource.

18. The computer-program product of claim 11, further storing instructions for performing unconstrained value protection when accounting for the amount of constrained demand.

19. The computer-program product of claim 18, wherein the performing unconstrained value protection comprises capping an unconstrained expectation of constrained demand ("UECD") based on a number of units of the resource that have been sold, or based on an unconditional expectation of observed sold ("UEOS") units.

20. The computer-program product of claim 11, further storing instructions for adjusting for partial censoring using linear interpolation.

21. A computer-implemented method comprising:
accessing a plurality of records from one or more storage devices, the plurality of records associated with a resource divided into a predetermined number of units, the plurality of records subject to a maximum cutoff threshold above which further records are not created, at least the resource and the units forming a hierarchy having a higher hierarchical level corresponding to the resource and a lower level corresponding to a disaggregation of the higher hierarchical level into units of the resource;
accessing a plurality of indicator variables that indicate a demand for a unit of the resource among a plurality of users;
modeling demand for the units of the resource by the plurality of users at a hierarchical level higher than the lower level corresponding to the units of the resource;
applying a censored regression model to the modeled demand based on the plurality of indicator variables to generate a partial-censoring-adjusted unconstrained demand, the applying comprising multiplying one or more observations of the indicator variables by one or more regression coefficients for the modeled demand as estimated by a maximum likelihood estimator (MLE);
using the censored regression model to adjust the plurality of records to account for an amount of constrained demand above the maximum cutoff threshold by distributing the partial-censoring-adjusted unconstrained demand to a hierarchical level lower than the hierarchical level at which the demand was modeled; and
transmitting information relating to the amount of constrained demand.

22. The method of claim 21, wherein the hierarchical level corresponds to the resource including the predetermined number of units, or a group of properties including the resource.

23. The method of claim 21, wherein the regression model accounts for the plurality of indicator variables together as a group.

24. The method of claim 21, wherein the plurality of transactions are aggregated over the resource and the analysis module pro-rates the modeled demand over the plurality of users.

25. The method of claim 21, further comprising calculating a shared estimate for a variance across the plurality of records.

26. The method of claim 21, further comprising outputting one or more of: an indication of how many units to make available per category of users at a given time; an offer to a user or category of users at a given time; and an indication of a level of overbooking that will be accommodated for a given unit of the resource, category, or overall for a given time.

27. The method of claim 21, wherein the censored regression model is customized to provide different models for different hierarchical levels of the resource.

28. The method of claim 21, further comprising performing unconstrained value protection when accounting for the amount of constrained demand.

29. The method of claim 28, wherein the performing unconstrained value protection comprises capping an unconstrained expectation of constrained demand ("UECD") based on a number of units of the resource that have been sold, or based on an unconditional expectation of observed sold ("UEOS") units.

30. The method of claim 21, further comprising adjusting for partial censoring using linear interpolation.

* * * * *